United States Patent
Suzuki et al.

(10) Patent No.: US 10,577,213 B2
(45) Date of Patent: Mar. 3, 2020

(54) COUNTER-EJECTOR

(71) Applicant: KABUSHIKI KAISHA ISOWA, Nagoya-shi, Aichi (JP)

(72) Inventors: Yukiomi Suzuki, Kasugai (JP); Yoshimichi Takahashi, Kitanagoya (JP)

(73) Assignee: KABUSHIKI KAISHA ISOWA, Aichi (JP)

( * ) Notice: Subject to any disclaimer, the term of this patent is extended or adjusted under 35 U.S.C. 154(b) by 9 days.

(21) Appl. No.: 16/002,606

(22) Filed: Jun. 7, 2018

(65) Prior Publication Data

US 2018/0362285 A1   Dec. 20, 2018

(30) Foreign Application Priority Data

Jun. 16, 2017  (JP) .................. 2017-118228

(51) Int. Cl.
  *B65G 59/06* (2006.01)
  *B65H 31/32* (2006.01)
  *B65H 31/20* (2006.01)
  *B31B 50/98* (2017.01)

(52) U.S. Cl.
  CPC ............ *B65H 31/32* (2013.01); *B31B 50/98* (2017.08); *B65G 59/061* (2013.01); *B65H 31/20* (2013.01)

(58) Field of Classification Search
  CPC ...... B31B 50/98; B65G 57/03; B65G 57/035; B65G 57/06; B65H 31/32; B65H 2701/1766; B65H 2301/42262; B65H 31/3027; B65H 31/3054
  See application file for complete search history.

(56) References Cited

U.S. PATENT DOCUMENTS 1,600,958 A * 9/1926 Hart ..................... B65B 35/50
                                                    83/862
2,668,626 A * 2/1954 Stuivenberg ........... G06K 13/14
                                                   414/789.9

(Continued)

FOREIGN PATENT DOCUMENTS

JP    S54-118080    9/1979
JP    2710761      2/1998

(Continued)

*Primary Examiner* — Gregory W Adams
(74) *Attorney, Agent, or Firm* — Brinks Gilson & Lione

(57) ABSTRACT

A counter-ejector comprises: an elevator including a table displaceable in a forward-backward direction parallel to a feeding-out direction; a backward restriction member for restricting a situation where backward edges of corrugated paperboard sheets in a batch are displaced in a direction opposite to the feeding-out direction; table upward-downward movement drive device; a table displacement drive device; and a control device. The control device executes a table downward movement control processing such that the table is displaced backwardly in at least part of a time period when the table is moved downwardly from the hopper part to a table stop position and a time period when the table is stopped at the table stop position, and a table upward movement control processing such that the table is displaced forwardly in a time period when the table is moved upwardly from the table stop position to the hopper part.

10 Claims, 11 Drawing Sheets

(56) References Cited

U.S. PATENT DOCUMENTS

| | | | | |
|---|---|---|---|---|
| 3,017,040 A * | 1/1962 | Bobst | B65H 29/34 | |
| | | | 414/790.6 | |
| 3,414,138 A * | 12/1968 | Junemann | D05B 33/02 | |
| | | | 414/793.8 | |
| 3,606,310 A * | 9/1971 | Larson | B65G 57/14 | |
| | | | 414/794.1 | |
| 4,195,959 A | 4/1980 | Schmitt | | |
| 4,642,013 A * | 2/1987 | Mundus | B65G 57/04 | |
| | | | 198/468.8 | |
| 4,796,879 A * | 1/1989 | Martini | B65H 31/30 | |
| | | | 271/218 | |
| 4,993,916 A * | 2/1991 | Dorner | B65G 47/082 | |
| | | | 198/468.11 | |
| 5,545,001 A | 8/1996 | Capdeboscq | | |
| 5,769,413 A * | 6/1998 | Hummel | B65H 31/32 | |
| | | | 271/218 | |
| 6,129,503 A | 10/2000 | Schenone | | |
| 6,481,952 B2 * | 11/2002 | Deutschle | B65H 31/32 | |
| | | | 271/211 | |
| 7,178,801 B2 * | 2/2007 | Kokubo | B65H 31/10 | |
| | | | 271/213 | |
| 8,356,967 B2 * | 1/2013 | Gammerler | B65H 31/18 | |
| | | | 414/790.8 | |
| 8,657,555 B2 * | 2/2014 | Kokubo | B65H 31/20 | |
| | | | 271/215 | |
| 8,876,681 B2 * | 11/2014 | Taketsugu | B65G 57/03 | |
| | | | 493/141 | |
| 9,156,646 B2 * | 10/2015 | Maier | B65H 31/32 | |
| 2005/0067763 A1 | 3/2005 | Kokubo et al. | | |
| 2013/0051968 A1 * | 2/2013 | Iturriza Iceta | B65H 29/14 | |
| | | | 414/790.3 | |

FOREIGN PATENT DOCUMENTS

| | | |
|---|---|---|
| JP | 3298896 | 7/2002 |
| JP | 4455244 | 4/2010 |
| JP | 5118416 | 1/2013 |
| JP | 5150352 | 2/2013 |
| JP | 5460966 | 4/2014 |
| JP | 5473138 | 4/2014 |

* cited by examiner

COUNTER-EJECTOR

RELATED APPLICATIONS

This application claims priority under 35 U.S.C. § 119 to Japanese Patent Application No. 2017-118228 filed on Jun. 16, 2017, the entire content of which is hereby incorporated by reference.

BACKGROUND OF THE INVENTION

1. Field of the Invention

The present invention relates to a counter-ejector comprising a ledge for separating a given number of corrugated paperboard sheets stacked in a hopper part to form a batch, a feeding-out conveyer disposed below the hopper part to feed out the batch in a given feeding-out direction, and a table capable of performing an upward-downward movement to transport the batch from the hopper part to the feeding-out conveyer. More specifically, the present invention relates to a counter-ejector configured such that the table is displaced in a direction opposite to the given feeding-out direction, when the table is moved downwardly from the hopper part toward a table stop position or stopped at the table stop position.

2. Description of the Related Art

Heretofore, as a counter-ejector equipped with a table capable of performing an upward-downward movement to transport a batch from a hopper part to a feeding-out conveyer, many counter-ejectors having various configurations have been known. For example, a counter-ejector described in Patent Document 1 (JP 5473138B) is configured such that, when a forward contact plate constituting a hopper part is displaced depending on the size of a corrugated paperboard sheet in its conveyance direction (conveyance-directional size of a corrugated paperboard sheet), a table is displaced in the same direction as a direction along which the forward contact plate is displaced, by an amount of the displacement of the forward contact plate, and, after a batch is passed or transferred from the table to a feeding-out conveyer, the table is moved upwardly from displaced position thereof (a position to which it has been displaced). In the counter-ejector described in the Patent Document 1, the above configuration makes it possible to shorten a time period necessary for transferring a batch from the table to the feeding-out conveyer, as the conveyance-directional size of the corrugated paperboard sheet becomes shorter.

SUMMARY OF THE INVENTION

Technical Problem

Meanwhile, according to orders, various corrugated paperboard sheets having different conveyance-directional sizes are supplied to a counter-ejector. Generally, as the conveyance-directional size of a corrugated paperboard sheet becomes longer, a weight per corrugated paperboard sheet becomes heavier. Due to batch transportation and management reasons, a per-batch number of corrugated paperboard sheets each having a relatively long conveyance-directional size is set to be less than the per-batch number of corrugated paperboard sheets each having a relatively short conveyance-directional size.

In the counter-ejector described in the Patent Document 1, assuming that corrugated paperboard sheets each having a relatively long conveyance-directional size are sequentially supplied thereto, the per-batch number of the corrugated paperboard sheets is relatively small, and therefore a time period necessary for stacking the corrugated paperboard sheets to form a batch is relatively short. On the other hand, assuming that, after a relatively small number of corrugated paperboard sheets each having a relatively long conveyance-directional size are formed as a batch, the batch is transferred from the table to feeding-out conveyer, a transfer time period from a time when the batch starts to be fed out forwardly from a position on the upper side of the table through until the batch is fully fed out forwardly, i.e., disappears from the position on the upper side of the table, is relatively long, due to the relatively long conveyance-directional size of the corrugated paperboard sheets. The table needs to continue to be stopped at a table stop position below a given feeding-out position where the feeding-out conveyer is disposed, until the transfer of the batch is completed. Due to an increase in the transfer time, a timing at which the table starts to be moved upwardly from the table stop position so as to receive a batch to be formed next is delayed, thereby leading to a problem of failing to speed up the entire operation of formation and feeding-out of a batch to be performed by the counter-ejector.

The present invention has been made in view of the above problem, and an object thereof is to provide a counter-ejector capable of shortening a time period necessary for transferring a batch from a table to a feeding-out conveyer by enabling the table to be displaced in a direction opposite to a given feeding-out direction along which the batch is fed out.

Solution to Problem

The present invention relates to a counter-ejector includes: a forward contact plate which comes into contact with a forward edge of a corrugated paperboard sheet supplied from a folder-gluer in a given conveyance direction; a correction plate which is disposed in opposed relation to the forward contact plate, and which comes into contact with a backward edge of the supplied corrugated paperboard sheet to align sheet edges; a ledge which separates the corrugated paperboard sheets stacked inside a hopper part configured by the forward contact plate and the correction plate, in order to form a batch including a given number of the corrugated paperboard sheets; a feeding-out conveyer which is disposed at a given feeding-out position below the forward contact plate and the correction plate, to feed out the batch in a given feeding-out direction oriented in a same direction as the conveyance direction; an elevator which comprises a table performing an upward-downward movement to transport the batch placed on the table from the hopper part to the feeding-out conveyer, and which is configured such that the table is displaceable in a forward-backward direction parallel to the feeding-out direction; a backward restriction member which is disposed between the correction plate and the feeding-out conveyer, and which comes into contact with the backward edges of the corrugated paperboard sheets in the batch placed on the table to restrict displacement of the batch in a direction opposite to the feeding-out direction; a table upward-downward movement drive device which moves the table upwardly and downwardly; a table displacement drive device which displaces the table in the forward-backward direction parallel to the feeding-out direction; and a control device which is configured to control the table upward-downward movement drive device and the table displacement drive device, wherein the control device is configured to execute: a table downward movement control processing of controlling the table upward-downward movement drive device and the table displacement drive device such that the table is displaced backwardly, in at least part of a time period including a time period during which the table is moved downwardly from the hopper part to a table stop position below the feeding-out position of the feeding-out conveyer, and a time period during which the table is stopped at the table stop position; and a table upward movement control processing of controlling the table upward-downward movement drive device and the table displacement drive device such that the table is displaced forwardly, in a time period during which the table is moved upwardly from the table stop position to the hopper part.

In the counter-ejector having the above feature, the table is moved upwardly and downwardly to transport the batch from the hopper part to the feeding-out conveyer, and displaced in the forward-backward direction parallel to the feeding-out direction. The backward restriction member is disposed between the correction plate and the feeding-out conveyer, and comes into contact with the backward edges of the corrugated paperboard sheets in the batch placed on the table to restrict displacement of the batch in a direction opposite to the feeding-out direction. According to the table downward movement control processing, the table is displaced backwardly, in at least part of the sum of the time period during which the table is moved downwardly from the hopper part to the table stop position, and the time period during which the table is stopped at the table stop position. According to the table upward movement control processing, the table is displaced forwardly, in the time period during which the table is moved upwardly from the table stop position to the hopper part. Therefore, by displacing the table in the backward direction opposite to the feeding-out direction along which the batch is fed out, it becomes possible to shorten a time period necessary for transferring the batch from the table to the feeding-out conveyer.

In a specific embodiment of the present invention, the counter-ejector may be configured such that the ledge is moved downwardly while being in contact with the batch on the table from thereabove, in a time period during which the table is moved downwardly from the hopper part to the table stop position. Alternatively, the counter-ejector may be configured such that a pressing bar provided separately from the ledge is moved downwardly while being in contact with the batch on the table from thereabove, in the time period during which the table is moved downwardly from the hopper part to the table stop position. In the latter configuration, a configuration may be employed in which the ledge is stopped at a given position between the hopper part and the feeding-out conveyer.

In a specific embodiment of the present invention, a distance by which a forward edge of the table is displaced forwardly toward a forward side of the correction plate and advanced into the hopper part when the table receives the batch consisting of the given number of corrugated paperboard sheets stacked in the hopper part is not particularly limited as long as the batch can be stably placed on the table. For example, the distance by which the table is advanced into the hopper part may be a distance obtained by multiplying the length of the stacked corrugated paperboard sheets in the conveyance direction by a given rate.

In a specific embodiment of the present invention, the backward displacement of the table in the table downward movement control processing is performed at least until the batch is completely fed out forwardly from a position on the upper side of the table, so that it disappears from the position on the upper side of the table. With a view to allowing the table to start upward movement in an early stage, the backward displacement of the table is preferably performed only until the batch is completely fed out forwardly from the position on the upper side of the table. However, the counter-ejector may be configured such that the backward displacement of the table is performed until the position of the forward edge of the table is shifted backwardly to the installation position of the backward restriction member.

In a specific embodiment of the present invention, the counter-ejector may comprise a detector for detecting the presence or absence of the batch on the upper side of the table, wherein whether or not the batch is completely fed out forwardly from the position on the upper side of the table may be determined based on a result of the detection by the detector. Alternatively, the counter-ejector may comprise a means to calculate the position of the forward edge of the table being displaced backwardly, and a movement amount of the feeding-out conveyer, wherein whether or not the batch is completely fed out forwardly from the position on the upper side of the table may be determined based on a result of the detection by the calculation means.

In a specific embodiment of the present invention, when the table receives the batch consisting of the given number of corrugated paperboard sheets stacked in the hopper part, the forward edge of the table needs to be displaced forwardly toward the forward side of the correction plate and advanced into the hopper part by a given distance. The counter-ejector may be configured such that the table is displaced forwardly by a distance equal to the given distance, in the time period during which the table is moved upwardly from the table stop position to the hopper part in the table upward movement control processing. Alternatively, the counter-ejector may be configured such that the table is displaced forwardly by part of the given distance, in the time period during which the table is moved upwardly from the table stop position to the hopper part in the table upward movement control processing, and, after the table reaches the hopper part, displaced forwardly by the remaining distance.

Preferably, the counter-ejector further comprises a detector which detects a presence or absence of the batch placed on the table, wherein, when the detector detects the absence of the batch after detecting the presence of the batch, the control device is configured to cause the table upward-downward movement drive device to start moving the table upwardly in order to execute the table upward movement control processing.

According to this feature, the table upward movement control processing is executed in an early stage, so that it becomes possible to advance a timing at which the table receives the next batch consisting of a given number of corrugated paperboard sheets to thereby speed up the entire operation of the counter-ejector.

In this specific embodiment, the detector may be installed to the table so as to be moved in the forward-backward direction and in the upward-downward direction. Alternatively, the detector may be installed to the elevator such that it is moved only in the forward-backward direction together with the table.

Preferably, in the counter-ejector of the present invention, the control device is configured to control the table upward-downward movement drive device and the table displacement drive device such that, in the table downward movement control processing, the table is displaced backwardly over an entire time period during which the table is moved downwardly from the hopper part to the table stop position.

According to this feature, the table is gradually displaced backwardly over the entire time period of the downward movement thereof, so that it becomes possible to prevent breaking of a stacked posture of the batch on the table.

In this specific embodiment, the table downward movement control processing may be processing of controlling the table upward-downward movement drive device and the table displacement drive device such that the table is displaced backwardly, not only in the time period during which the table is moved downwardly but also in the time period during which the table is stopped at the table stop position.

Preferably, in the counter-ejector of the present invention, the control device is configured to control the table upward-downward movement drive device and the table displacement drive device such that, in the table upward movement control processing, the table is displaced forwardly over an entire time period during which the table is moved upwardly from the table stop position to the hopper part.

According to this feature, the table simultaneously performs the upward movement and the forward displacement, so that it becomes possible to advance a timing at which the table receives the next batch to thereby speed up the entire operation of the counter-ejector, as compared to a case where the upward movement and the forward displacement of the table are performed, respectively, in different time periods.

In this specific embodiment, the table upward movement control processing may be processing of controlling the table upward-downward movement drive device and the table displacement drive device such that the table is displaced forwardly, not only in the time period during which the table is moved upwardly but also in a time period during which the upward movement of the table is stopped after the table is moved upwardly to the hopper part.

Preferably, the counter-ejector of the present invention comprises: a ledge upward-downward movement drive device which moves the ledge upwardly and downwardly; a ledge displacement drive device which displaces the ledge in the forward-backward direction parallel to the feeding-out direction; an upper conveyer which is disposed at a given cooperative feeding-out position below the forward contact plate in order to feed out the batch in the feeding-out direction in cooperation with the feeding-out conveyer; and a forward restriction member which is disposed between the forward contact plate and the upper conveyer, and which is configured to be displaceable in the forward-backward direction together with the forward contact plate, and which comes into contact with the forward edges of the corrugated paperboard sheets in the batch placed on the table to restrict displacement of the corrugated paperboard sheets in the feeding-out direction, wherein the control device is configured to execute: a ledge downward movement control processing of controlling the ledge upward-downward movement drive device and the ledge displacement drive device such that the ledge is displaced forwardly, in at least part of a time period including a time period during which the ledge is moved downwardly from the hopper part to the upper conveyer, and a time period during which the ledge is stopped at the cooperative feeding-out position of the upper conveyer; and a ledge upward movement control processing of controlling the ledge upward-downward movement drive device such that the ledge is moved upwardly from the upper conveyer to a given standby position above the hopper part.

According to this feature, the ledge is displaced forwardly, in at least part of the sum of the time period during which the ledge is moved downwardly, and the time period during which the ledge is stopped at the cooperative feeding-out position, so that it becomes possible to advance a timing at which the ledge is returned to the standby position to form the next batch to thereby speed up the entire operation of the counter-ejector.

In this specific embodiment, the counter-ejector may be configured such that, in ledge upward movement control processing, the ledge is displaced forwardly in the period during which the ledge is moved upwardly from the cooperative feeding-out position of the upper conveyer to the standby position above the hopper part, as long as the ledge does not collide with the corrugated paperboard sheets stacked in the hopper part. Alternatively, the counter-ejector may be configured such that, in ledge upward movement control processing, the ledge is displaced forwardly from the hopper part to a position free of collision with the corrugated paperboard sheets stacked in the hopper part, and then moved straight upwardly from the cooperative feeding-out position of the upper conveyer to the standby position above the hopper part.

Preferably, the counter-ejector further comprises a conveyer drive control device which drives the feeding-out conveyer when the table is moved downwardly to the table stop position, wherein, in the ledge downward movement control processing, the control device is configured to control the ledge upward-downward movement drive device and the ledge displacement drive device in order to inhibit the ledge from being displaced forwardly in such a state that the ledge is in contact with the batch on the feeding-out conveyer from thereabove, in a given displacement inhibition time period after the table is moved downwardly to the table stop position, wherein, after an elapse of the displacement inhibition time period, the control device is configured to control the ledge upward-downward movement drive device and the ledge displacement drive device such that the ledge is displaced forwardly, only in a given upward-downward movement inhibition time period during which the ledge is stopped at the cooperative feeding-out position of the upper conveyer, and wherein, in the ledge upward movement control processing, after an elapse of the upward-downward movement inhibition time period, the control device is configured to control the ledge upward-downward movement drive device and the ledge displacement drive device such that the ledge is displaced forwardly when the ledge is moved upwardly toward the standby position.

According to this feature, in the displacement inhibition time period, the ledge is inhibited from being displaced forwardly in the state in which the ledge is in contact with the batch on the feeding-out conveyer before start of its feeding-out operation, from thereabove, so that it becomes possible to prevent a situation where only the ledge is displaced forwardly before the feeding-out operation of the feeding-out conveyer, thereby leading to breaking of the stacked posture of the batch. Further, the ledge is displaced forwardly under the condition that it is stopped at the cooperative feeding-out position only in the upward-downward movement inhibition time period, so that it becomes possible to smoothly move a front end of the batch being fed out by the feeding-out conveyer, from a lower surface of the ledge to a lower surface of the upper conveyer.

In this specific embodiment, in the ledge downward movement control processing, the ledge is in contact with the batch on the feeding-out conveyer from thereabove. In this case, the counter-ejector may be configured such that the lower surface of the ledge is located slightly below the lower surface of the upper conveyer so as to press the batch from thereabove, or may be configured such that the lower surface of the ledge is located at the same height position as that of the lower surface of the upper conveyer so as to restrict upward swelling of the batch.

In this specific embodiment, the displacement inhibition time period is a time period from issuance of an instruction for the feeding-out operation of the feeding-out conveyer through until the feeding-out conveyer actually starts the feeding-out operation. The instruction for the feeding-out operation of the feeding-out conveyer is generated (issued) when the table is moved downwardly to the table stop position. A time when the ledge is moved downwardly to the cooperative feeding-out position of the upper conveyer may be approximately the same as a time when the table is moved downwardly to the table stop position, or may be any time within the displacement inhibition time period.

In this specific embodiment, the upward-downward movement inhibition time period is a time period necessary for a forward end of the batch fed out by the feeding-out conveyer to enter a position below the lower surface of the upper conveyer from a position below the lower surface of the ledge.

Preferably, in the above counter-ejector, in the ledge downward movement control processing, the control device is configured to control the ledge upward-downward movement drive device and the ledge displacement drive device such that the ledge is displaced forwardly over an entire period during which the ledge is moved downwardly from the hopper part to the upper conveyer.

According to this feature, the ledge simultaneously performs the downward movement and the forward displacement, so that it becomes possible to advance a timing at which the ledge is returned to the standby position to form the next batch to thereby speed up the entire operation of the counter-ejector, as compared to a case where the downward movement and the forward displacement of the ledge are performed, respectively, in different time periods.

Preferably, in the above counter-ejector, the control device is configured to control the ledge upward-downward movement drive device and the table upward-downward movement drive device such that the table starts to be moved downwardly from the hopper part toward the table stop position, before the ledge starts to be moved downwardly from the hopper part toward the upper conveyer.

According to this feature, it becomes possible to suppress a situation where a pressing force is applied from the ledge to the batch on the table when the table is displaced backwardly during the downward movement, to reduce friction acting between an upper surface of the table and a lowest one of the corrugated paperboard sheets in the batch, thereby preventing breaking of the stacked posture of the batch.

Preferably, in the above counter-ejector, the control device is configured to control the ledge upward-downward movement drive device and the table upward-downward movement drive device such that the table starts to be moved downwardly from the hopper part to the table stop position at an acceleration larger than an acceleration generated when the ledge starts to be moved downwardly from the hopper part toward the upper conveyer.

According to this feature, it becomes possible to suppress a situation where a pressing force is applied from the ledge to the batch on the table when the table is displaced backwardly during the downward movement, to reduce friction acting between the upper surface of the table and the lowest one of the corrugated paperboard sheets in the batch, thereby preventing breaking of the stacked posture of the batch.

Preferably, the counter-ejector of the present invention further comprises an air blower which is operable to blow air toward the batch on the table from therebelow, in at least part of a time period during which the table is moved downwardly from the hopper part to the table stop position.

According to this feature, it is possible to reduce friction acting between the upper surface of the table and the lowest one of the corrugated paperboard sheets in the batch, when the table is displaced backwardly, thereby preventing breaking of the stacked posture of the batch.

In this specific embodiment, the air blower may be installed to the table, or may be disposed at a fixed position below the feeding-out conveyer.

In this specific embodiment, the air blower may be configured to inhibit blowing operation before the table receives the batch from the hopper part. Alternatively, the air blower may be configured such that, before the table receives the batch from the hopper part, air is blown in a blowing amount less than that in the period during which the table is moved downwardly from the hopper part to the stable stop position.

Preferably, in the counter-ejector of the present invention, the table comprises a plurality of mounting extended parts which are arranged in a direction orthogonal to the conveyance direction in spaced-apart relation to each other, and which extend horizontally, and the backward restriction member comprises a plurality of restriction extended parts which are arranged, respectively, in gaps between adjacent ones of the mounting extended parts, and which extend vertically.

According to this feature, the mounting extended parts of the table can be smoothly displaced in the forward-backward direction without collision with the restriction extended parts of the backward restriction member.

DETAILED DESCRIPTION OF THE PREFERRED EMBODIMENTS

Embodiment

Figure 1:
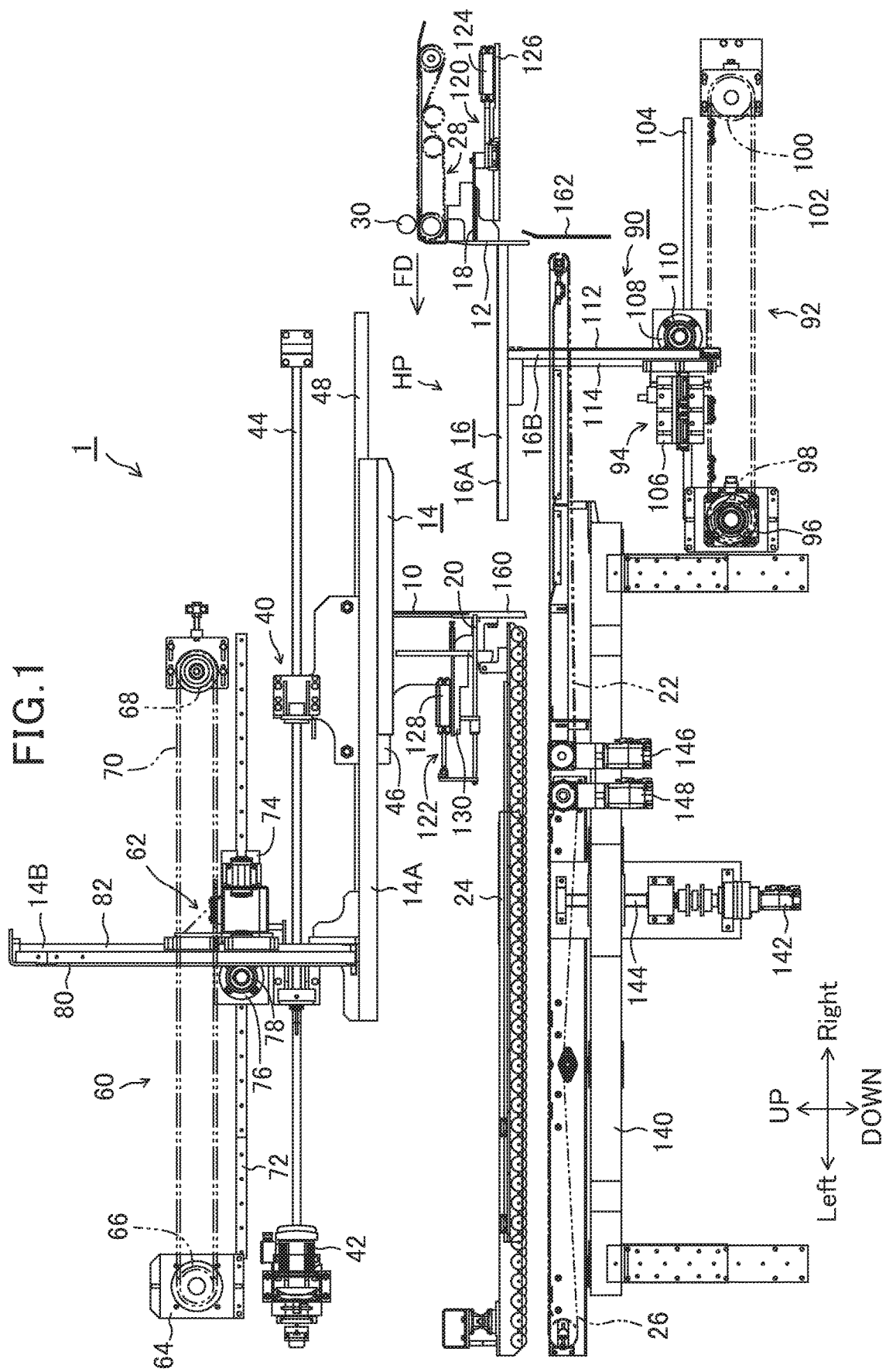
FIG. 1 is a front view depicting an overall configuration of a counter-ejector 1 according to one embodiment of the present invention.

With reference to the drawings, a counter-ejector according to one embodiment of the present invention will now be described. A counter-ejector is a device for stacking corrugated paperboard sheets sequentially fed from a folder-gluer and separating a given number of the corrugated paperboard sheets as a batch, and its basic configuration is well known. FIG. 1 is a front view depicting an overall configuration of the counter-ejector according to this embodiment. The directions indicated by the arrowed lines in FIG. 1 is an upward-downward direction and a rightward-leftward direction, and a direction orthogonal to the two directions is a frontward-rearward direction. In FIGS. 2 to 11, directions are indicated in the same manner as those in FIG. 1.

[Mechanical Configuration of Counter-Ejector]

In FIG. 1, the counter-ejector 1 comprises a forward contact plate 10, a correction plate 12, a main ledge 14, a table 16, an upstream-side auxiliary ledge 18, a downstream-side auxiliary ledge 20, a feeding-out conveyer 22, an upper conveyer 24, and a retention conveyer 26. A feeding conveyer 28 and a feeding roller 30 are on the right side of the counter-ejector 1. A corrugated paperboard sheet SH folded and glued by a folder-gluer is fed to the counter-ejector 1 by the feeding conveyer 28 and the feeding roller 30. In this embodiment, a conveyance (feeding) direction FD of the corrugated paperboard sheet SH is a direction from the right side to the left side in FIG. 1.

A hopper part HP having a space for allowing a plurality of the corrugated paperboard sheets SH to be stacked therein is formed by the forward contact plate 10, the correction plate 12, the upstream-side auxiliary ledge 18, and the downstream-side auxiliary ledge 20. The forward contact plate 10 is disposed on the left side of the hopper part HP, such that it is contactable with a left end, i.e., forward (leading) end, of the corrugated paperboard sheet SH fed thereinto. The correction plate 12 is disposed on the right side of the hopper part HP, such that it is contactable with a right end, i.e., backward (trailing) end, of the corrugated paperboard sheet SH fed thereinto. The correction plate 12 is configured to perform a heretofore-known correction movement, i.e., reciprocatingly move in the rightward-leftward direction, to align backward edges of the stacked corrugated paperboard sheets SH. The correction plate 12 is disposed in a constant positional relationship with the feeding conveyer 28 and the feeding roller 30, such that it is contactable with the backward edges of the stacked corrugated paperboard sheets SH during the correction movement.

(Configuration of Forward Contact Plate Displacement Mechanism)

A forward contact plate displacement mechanism 40 is provided as a means to displace the forward contact plate 10 in the rightward-leftward direction. The forward contact plate-displacing mechanism 40 comprises a forward contact plate drive motor 42, a threaded shaft 44, a forward contact plate support block 46, and a guide rail 48. The threaded shaft 44 is rotatably supported by a frame of the counter-ejector 1, in a horizontal posture along the rightward-leftward direction. The forward contact plate drive motor 42 is coupled to the threaded shaft 44, and operable to selectively rotationally drive the threaded shaft 44 in either of a normal direction and a reverse direction. The forward contact plate drive motor 42 has a built-in encoder for detecting a rotational direction and a rotational amount thereof. The encoder of the forward contact plate drive motor 42 has a heretofore-known configuration capable of generating a rotation detection signal indicative of the rotational direction and the rotational amount thereof. The guide rail 48 is supported by the frame of the counter-ejector 1, at a position adjacent to the threaded shaft 44 and in a horizontal posture along the rightward-leftward direction. The guide rail 48 is engaged with a guide groove of the forward contact plate support block 46 to guide the forward contact plate support block 46 in the rightward-leftward direction.

The forward contact plate support block 46 comprises a nut portion threadingly engaged with the threaded shaft 44, and is configured to be displaced in the rightward-leftward direction according to the rotational direction and the rotational amount of the threaded shaft 44. The forward contact plate 10 is fixed to a right end of the forward contact plate support block 46, in a vertical posture along the upward-downward direction. The forward contact plate 10 is positioned such that a distance with respect to the correction plate 12 corresponds to a sheet length LS of the corrugated paperboard sheet SH in the conveyance direction FD (conveyance-directional sheet length LS of the corrugated paperboard sheet SH).

(Configuration of Main Ledge Displacement Mechanism and Main Ledge Upward-Downward Movement Mechanism)

A main ledge displacement mechanism 60 and a main ledge upward-downward movement mechanism 62 are provided as a means to displace the main ledge 14 in the rightward-leftward direction and move the main ledge 14 in the upward-downward direction. The main ledge displacement mechanism 60 comprises a ledge displacement motor 64, a drive pulley 66, a driven pulley 68, a ledge drive belt 70, a guide rail 72, and a ledge support block 74.

The drive pulley 66 and the driven pulley 68 are rotatably supported by the frame of the counter-ejector 1. The ledge drive belt 70 is provided between the drive pulley 66 and the driven pulley 68 in a tensioned manner, in a horizontal posture along the rightward-leftward direction. The ledge displacement motor 64 is coupled to the drive pulley 66, and operable to selectively rotationally drive the drive pulley 66 in either of a normal direction and a reverse direction. The ledge drive motor 64 has a built-in encoder for detecting a rotational direction and a rotational amount thereof. The guide rail 72 is supported by the frame of the counter-ejector 1, at a position adjacent to the ledge drive belt 70 and in a horizontal posture along the rightward-leftward direction. The guide rail 72 is engaged with a guide groove of the ledge support block 74 to guide the ledge support block 74 in the rightward-leftward direction. The ledge support block 74 has an upper end fixed to the ledge drive belt 70.

The main ledge upward-downward movement mechanism 62 comprises a ledge upward-downward movement motor 76, a pinion 78, a rack 80, and a guide rail 82. The ledge upward-downward movement motor 76 is fixed to the ledge support block 74. The ledge upward-downward movement motor 76 is coupled to the pinion 78, and operable to selectively rotationally drive the pinion 78 in either of a normal direction and a reverse direction. The ledge upward-downward movement motor 76 has a built-in encoder for detecting a rotational direction and a rotational amount thereof. The main ledge 14 has an L shape which comprises a horizontal extended portion 14A and a vertical standing portion 14B. The rack 80 is fixed to the vertical standing portion 14B of the main ledge 14, in a vertical posture along the upward-downward direction. The rack 80 is meshed with the pinion 78. The guide rail 82 is fixed to the vertical standing portion 14B of the main ledge 14, in a vertical posture along the upward-downward direction. The guide rail 82 is engaged with a guide groove of the ledge support block 74 to guide the vertical standing portion 14B of the main ledge 14 in the upward-downward direction.

The main ledge 14 is positioned in the rightward-leftward direction according to the rotational direction and the rotational amount of the ledge displacement motor 64, and positioned in the upward-downward direction according to the rotational direction and the rotational amount of the ledge upward-downward movement motor 76.

(Configuration of Table Displacement Mechanism and Table Upward-Downward Movement Mechanism)

In order to displace the table 16 in the rightward-leftward direction and move the table 16 in the upward-downward direction, an elevator 90 comprises a table displacement mechanism 92 and a table upward-downward movement mechanism 94. The table displacement mechanism 92 comprises a table displacement motor 96, a drive pulley 98, a driven pulley 100, a table drive belt 102, a guide rail 104, and a table support block 106.

The drive pulley 98 and the driven pulley 100 are rotatably supported by the frame of the counter-ejector 1. The table drive belt 102 is provided between the drive pulley 98 and the driven pulley 100 in a tensioned manner, in a horizontal posture along the rightward-leftward direction. The table displacement motor 96 is coupled to the drive pulley 98, and operable to selectively rotationally drive the drive pulley 98 in either of a normal direction and a reverse direction. The table displacement motor 96 has a built-in encoder for detecting a rotational direction and a rotational amount thereof. The guide rail 104 is supported by the frame of the counter-ejector 1, at a position adjacent to the table drive belt 102 and in a horizontal posture along the rightward-leftward direction. The guide rail 104 is engaged with a guide groove of the table support block 106 to guide the table support block 106 in the rightward-leftward direction. The table support block 106 has a lower end fixed to the table drive belt 102.

The table upward-downward movement mechanism 94 comprises a table upward-downward movement motor 108, a pinion 110, a rack 112, and a guide rail 114. The table upward-downward movement motor 108 is fixed to the table support block 106. The table upward-downward movement motor 108 is coupled to the pinion 110, and operable to selectively rotationally drive the pinion 110 in either of a normal direction and a reverse direction. The table upward-downward movement motor 108 has a built-in encoder for detecting a rotational direction and a rotational amount thereof. The table 16 has a T shape which comprises a horizontal extended portion 16A and a vertical standing portion 16B. The rack 112 is fixed to the vertical standing portion 16B of the table 16, in a vertical posture along the upward-downward direction. The rack 112 is meshed with the pinion 110. The guide rail 114 is fixed to the vertical standing portion 16B of the table 16, in a vertical posture along the upward-downward direction. The guide rail 114 is engaged with a guide groove of the table support block 106 to guide the vertical standing portion 16B of the table 16 in the upward-downward direction.

The table 16 is positioned in the rightward-leftward direction according to the rotational direction and the rotational amount of the table displacement motor 96, and positioned in the upward-downward direction according to the rotational direction and the rotational amount of the table upward-downward movement motor 108. In this embodiment, the table 16 has a size capable of placement thereon of a corrugated paperboard sheet having a maximum size which can be handled by a corrugated paperboard box making machine. Specifically, the size of the horizontal extended portion 16A of the table 16 in the conveyance direction FD is set according to a sheet length LS of the maximum-size corrugated paperboard sheet in the conveyance direction FD. Further, in this embodiment, a distance from the correction plate 12 to a left edge 16C of the horizontal extended portion 16A of the table 16 is set according to the conveyance-directional sheet length LS of the corrugated paperboard sheet SH designated by an order. Specifically, the distance from the correction plate 12 to the left edge 16C of the horizontal extended portion 16A of the table 16 is set to a large value along with an increase in the conveyance-directional sheet length LS. This setting method is described in JP 5473138B.

(Configurations of Auxiliary Ledge Displacement Mechanisms)

Two auxiliary ledge displacement mechanisms 120, 122 are provided as a means to displace the upstream-side auxiliary ledge 18 and the downstream-side auxiliary ledge 20 in the rightward-leftward direction. In order to displace the upstream-side auxiliary ledge 18 in the rightward-leftward direction, the auxiliary ledge displacement mechanism 120 comprises a ledge drive cylinder 124 and a ledge support base 126. The ledge support base 126 is fixed to the frame of the counter-ejector 1, at a position adjacent to the correction plate 12 and in a horizontal posture along the rightward-leftward direction. The ledge drive cylinder 124 is supported by the ledge support base 126. The ledge drive cylinder 124 comprises an actuation rod configured to be movable in the rightward-leftward direction, and coupled to the upstream-side auxiliary ledge 18. The upstream-side auxiliary ledge 18 is guided in the rightward-leftward direction by a linear guide disposed on the ledge support base 126.

In order to displace the downstream-side auxiliary ledge 20 in the rightward-leftward direction, the auxiliary ledge displacement mechanism 122 comprises a ledge drive cylinder 128 and a ledge support base 130. The ledge support base 130 is fixed to a lower end of the forward contact plate support block 46, in a horizontal posture along the rightward-leftward direction. The ledge drive cylinder 128 is supported by the ledge support base 130. The ledge drive cylinder 128 comprises an actuation rod configured to be movable in the rightward-leftward direction, and coupled to the downstream-side auxiliary ledge 20. The downstream-side auxiliary ledge 20 is guided in the rightward-leftward direction by a linear guide disposed on the ledge support base 130.

The upstream-side auxiliary ledge 18 is disposed to be advanceable and retractable in the rightward-leftward direction with respect to the correction plate 12. The downstream-side auxiliary ledge 20 is disposed to be advanceable and retractable in the rightward-leftward direction with respect to the forward contact plate 10. The two auxiliary ledges 18, 20 are configured such that it is moved, respectively, in directions causing them to come close to each other to support a lower surface of the corrugated paperboard sheet SH, and then moved, respectively, in directions causing them to come away from each other to transfer the corrugated paperboard sheet SH to the table 16.

(Configuration of Conveyer)

A conveyer support frame 140 is supported by the frame of the counter-ejector 1, in a horizontal posture along the rightward-leftward direction and in an upwardly and downwardly movable manner. The feeding-out conveyer 22 and the retention conveyer 26 are supported by the conveyer support frame 140. A conveyer upward-downward movement motor 142 is fixed to the frame of the counter-ejector 1. A threaded shaft 144 is rotatably supported by the frame of the counter-ejector 1, in a vertical posture along the upward-downward direction. The conveyer upward-downward movement motor 142 is coupled to the threaded shaft 144, and operable to selectively rotationally drive the threaded shaft 144 in either of a normal direction and a reverse direction. The conveyer upward-downward movement motor 142 has a built-in encoder for detecting a rotational direction and a rotational amount thereof. The conveyer support frame 140 comprises a nut portion threadingly engaged with the threaded shaft 144, and is configured to be moved upwardly and downwardly according to the rotational direction and the rotational amount of the threaded shaft 144.

The feeding-out conveyer 22 is disposed below the hopper part HP over a range including a rightward-leftward directional region of the hopper part HP and a region leftward of the forward contact plate 10, in a horizontal posture along the rightward-leftward direction. The retention conveyer 26 is disposed on the left side of the feeding-out conveyer 22, in a horizontal posture along the rightward-leftward direction. The retention conveyer 26 is operable to convey the batch to a downstream-side conveyance conveyer while retaining a plurality of the batches fed out from the feeding-out conveyer 22. A feeding-out motor 146 is fixed to the conveyer support frame 140, and operable to drive the feeding-out conveyer 22. The feeding-out motor 146 has a built-in encoder for detecting a rotational direction and a rotational amount thereof. A retention control motor 148 is fixed to the conveyer support frame 140, and operable to drive the retention conveyer 26. The retention control motor 148 has a built-in encoder for detecting a rotational direction and a rotational amount thereof.

The upper conveyer 24 is installed to the frame of the counter-ejector 1 at a given position below the forward contact plate 10 and above the feeding-out conveyer 22, in a horizontal posture along the rightward-leftward direction. The upper conveyer 24 comprises a large number of freely-rotatable rollers arranged along a lower surface thereof, and is disposed in a region on the left side of the forward contact plate 10 in opposed relation to the feeding-out conveyer 22 and the retention conveyer 26. A right end of the upper conveyer 24 is coupled to the forward contact plate support block 46, and configured to be extended and contracted in the rightward-leftward direction along with the rightward-leftward directional displacement of the forward contact plate 10.

A gap between the upper conveyer 24 and each of the feeding-out conveyer 22 and the retention conveyer 26 is set according to the rotational direction and the rotational amount of the conveyer upward-downward movement motor 142, such that it becomes approximately equal to an upward-downward directional thickness of the batch. The upward-downward directional thickness of the batch is determined according to the number of corrugated paperboard sheets (sheet number) per batch designated by an order.

(Configurations of Forward Restriction Member and Backward Restriction Member)

Figure 2:
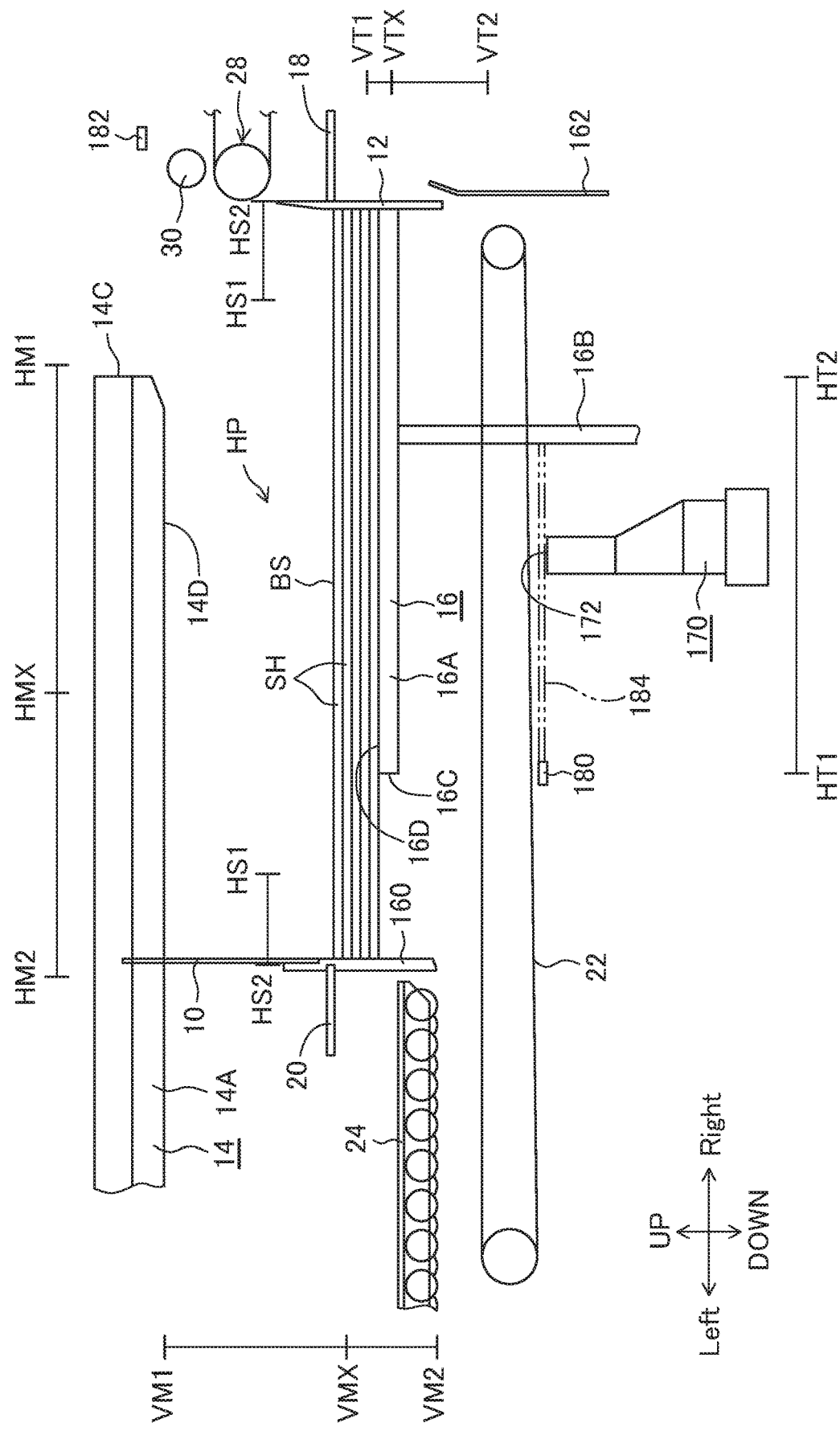
FIG. 2 is an explanatory diagram depicting respective movable ranges a main ledge 14, a table 16, and two auxiliary ledges 18, 20.

A forward restriction member 160 and a backward restriction member 162 are provided as a means to restrict a rightward-leftward directional displacement of forward and backward edges of the corrugated paperboard sheet SH stacked on the horizontal extended portion 16A of the table 16. FIG. 2 is a schematic diagram enlargedly depicting the vicinity of the hopper part HP depicted in FIG. 1. In FIGS. 1 and 2, the forward restriction member 160 is fixed to the right end of the forward contact plate support block 46, in a vertical posture along the upward-downward direction. The forward restriction member 160 extends from a lower end of the forward contact plate 10 to a position adjacent to the lower surface of the upper conveyer 24. As depicted in FIG. 2, the forward restriction member 160 is disposed such that a right surface of the forward contact plate 10 becomes approximately flush with a right surface of the forward restriction member 160. When the horizontal extended portion 14A of the main ledge 14 is displaced leftwardly in a state in which the batch BS is sandwiched between a lower surface of the horizontal extended portion 14A of the main ledge 14 and an upper surface of the horizontal extended portion 16A of the table 16, the forward restriction member 160 is operable to restrict a leftward displacement of the corrugated paperboard sheets SH in the batch BS.

In FIGS. 1 and 2, the backward restriction member 162 is disposed at a position adjacent to the correction plate 12 such that a left surface of the backward restriction member 162 is located slightly rightward of a left surface of the correction plate 12 in a state in which the correction plate 12 is moved to its rightwardmost position, and fixed to the frame of the counter-ejector 1, in a vertical posture along the upward-downward direction. An upper end of the backward restriction member 162 is bent rightwardly to extend obliquely upwardly beyond a lower end of the correction plate 12. The bent shape of the upper end of the backward restriction member 162 and the arrangement in which the left surface of the backward restriction member 162 is located slightly rightward of the left surface of the correction plate 12 make it possible to prevent the backward edges aligned by the correction plate 12 from being stuck to an upper portion of the backward restriction member 162. The backward restriction member 162 extends from the lower end of the correction plate 12 to a position below the feeding-out conveyer 22. When the horizontal extended portion 16A of the table 16 is displaced rightwardly in a state in which the corrugated paperboard sheets SH are stacked on the horizontal extended portion 16A of the table 16, the backward restriction member 162 is operable to restrict a rightward displacement of the corrugated paperboard sheets SH. A distance by which a lower end of the backward restriction member 162 extends downwardly from the lower end of the correction plate 12 is set such that, in a state in which the feeding-out conveyer 22 is moved downwardly to its downwardmost position, an upper surface of the upside of the feeding-out conveyer 22 is located at approximately the same height position as that of the lower end of the backward restriction member 162.

In this embodiment, the horizontal extended portion 16A of the table 16 comprises a large number of mounting extended parts arranged in a frontward-rearward direction, i.e., a direction orthogonal to the conveyance direction FD, in spaced-apart relation to each other. The backward restriction member 162 comprises a large number of restriction extended parts arranged in the frontward-rearward direction, i.e., a direction orthogonal to the conveyance direction FD, in spaced-apart relation to each other. The restriction extended parts are disposed, respectively, in gaps between adjacent ones of the mounting extended parts.

(Configuration of Air Blower)

An air blower 170 is provided as a means to blow air toward the corrugated paperboard sheets SH stacked on the horizontal extended portion 16A of the table 16. As depicted in FIG. 2, the air blower 170 is installed to the frame of the counter-ejector 1 at a position beneath the feeding-out conveyer 22. The air blower 170 comprises a blowing port 172, and a blower motor 174 indicated in FIG. 3. The blowing port 172 is opened toward the horizontal extended portion 16A of the table 16 at a position adjacent to the feeding-out conveyer 22. The blower motor 174 is operable to rotationally drive a blower fan of the air blower 170.

(Configurations of Various Detector)

A batch detector 180 is installed to a frame of the elevator 90, as a means to detect the presence or absence of the batch BS on the upper side of the horizontal extended portion 16A of the table 16. As depicted in FIG. 2, the batch detector 180 is disposed in a constant positional relationship with the feeding-out conveyer 22 in the upward-downward direction, and coupled to the frame of the elevator 90 through a coupling member 184 such that it is displaced in the rightward-leftward direction together with the table 16. In this embodiment, when the upward-downward directional position of the feeding-out conveyer 22 is adjusted, the upward-downward directional position of the batch detector 180 is also adjusted. Through the operation of moving the upper surface 16D of the horizontal extended portion 16A of the table 16 downwardly to a position slightly below the upside of the feeding-out conveyer 22, the batch BS stacked on the horizontal extended portion 16A of the table 16 is transferred to the feeding-out conveyer 22. The batch detector 180 is operable to detect whether or not the batch BS transferred to the feeding-out conveyer 22 exists on the upper side of the horizontal extended portion 16A. In this embodiment, the batch detector 180 is composed of an optical sensor which comprises a light-emitting unit for emitting light toward a left edge 16C of the horizontal extended portion 16A, and a light-receiving unit for receiving light reflected by a lower surface of the batch BS. The batch detector 180 is configured such that it reaches a detectable state when the horizontal extended portion 16A of the table 16 comes close thereto to fall within a given detectable distance, and then generates an absence-of-batch detection signal SD when a state on the upper side of the horizontal extended portion 16A is changed from a state in which the batch BS exists to a state in which the batch BS does not exist.

A sheet detector 182 is installed to the frame of the counter-ejector 1, as a means to detect passing of an edge of the corrugated paperboard sheet SH fed by the feeding conveyer 28 and the feeding roller 30. As depicted in FIG. 2, the sheet detector 182 is disposed adjacent to the feeding roller 30. The sheet detector 182 is composed of an optical sensor which comprises a light-emitting unit for emitting light downwardly, and a light-receiving unit for receiving light reflected by an upper surface of the corrugated paperboard sheet SH. The sheet detector 182 is configured to generate a detection signal in response to passing of the edge of the corrugated paperboard sheet SH being fed.

[Electrical Configuration of Counter-Ejector]

Figure 3:
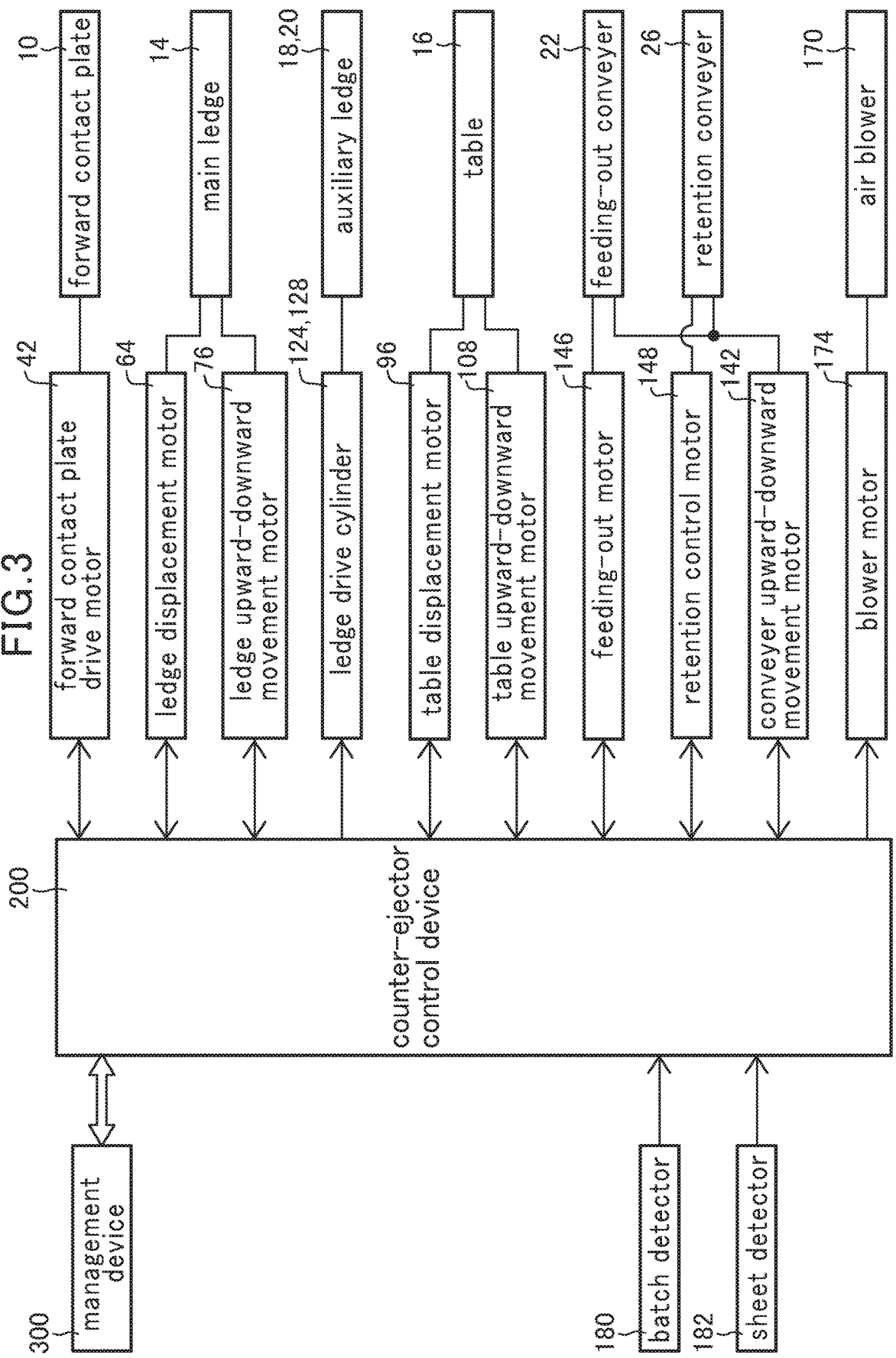
FIG. 3 is a block diagram depicting an electrical configuration of the counter-ejector 1.

With reference to FIG. 3, an electrical configuration for controlling the counter-ejector 1 according to this embodiment will be described below. FIG. 3 is a block diagram depicting the electrical configuration of the counter-ejector 1. In FIG. 3, a counter-ejector control device 200 is configured to control the entire operation of the counter-ejector 1. A management device 300 is configured to perform production management of a heretofore-known corrugated paperboard box making machine so as to execute a sequence of different orders, and supply, to the control unit 200, control information regarding each order, such as production speed, size of a corrugated paperboard sheet, and a sheet number per batch.

The control device 200 is connected to the batch detector 180 and the sheet detector 182. The control device 200 is operable, based on a detection signal from the sheet detector 182, to count the number of corrugated paperboard sheets SH fed by the feeding conveyer 28 and the feeding roller 30. The control device 200 is operable to control the motors for driving respective components of the counter-ejector 1, according to the control information from the management device 300 and the counted number of the fed corrugated paperboard sheets SH. The control device 200 is connected to: the ledge displacement motor 64 and the ledge upward-downward movement motor 76 for moving the main ledge 14; the ledge drive cylinders 124, 128 for moving the auxiliary ledges 18, 20; the table displacement motor 96 and the table upward-downward movement motor 108 for moving the table 16; the feeding-out motor 146 and the retention control motor 148 for driving the feeding-out conveyer 22 and the retention conveyer 26, respectively; the conveyer upward-downward movement motor 142 for moving upwardly and downwardly the feeding-out conveyer 22 and the retention conveyer 26; and the blower motor 174 for driving the air blower 170.

The control device 200 is composed of a computer comprising a CPU, a ROM and a RAM. The ROM fixedly stores therein a control program for controlling the counter-ejector 1, and various set values. The RAM is operable to temporarily store therein a result of processing by the CPU, such as the counted number of the fed corrugated paperboard sheets SH, and the control information from the management device 300.

The control device 200 is operable, according to execution of the control program, to perform processing of calculating positions of various members such as the forward contact plate 10, and processing of generating various control signals such as an aftermentioned conveyer drive instruction. Specifically, the control device 200 is operable, based on a rotation detection signal from the built-in encoder of the forward contact plate drive motor 42, to calculate the rightward-leftward directional position of the forward contact plate 10. The control device 200 is operable, based on rotation detection signals from the built-in encoders of the ledge displacement motor 64 and the ledge upward-downward movement motor 76, to calculate the rightward-leftward directional position and the upward-downward directional position of the main ledge 14. The control device 200 is operable, based on rotation detection signals from the built-in encoders of the table displacement motor 96 and the table upward-downward movement motor 108, to calculate the rightward-leftward directional position and the upward-downward directional position of the table 16. The control device 200 is operable, based on rotation detection signals from the built-in encoders of the feeding-out motor 146 and the retention control motor 148, to calculate a movement amount of the feeding-out conveyer 22 and a movement amount of the retention conveyer 26. The control device 200 is operable, based on a rotation detection signal from the built-in encoder of the conveyer upward-downward movement motor 142, to calculate respective upward-downward directional positions of the feeding-out conveyer 22 and the retention conveyer 26. The control device 200 is operable, when the upper surface 16D of the horizontal extended portion 16A of the table 16 is moved downwardly to an aftermentioned table downwardmost position VT2, to supply, to the feeding-out motor 146, a conveyer drive instruction CD for instructing the feeding-out motor 146 to start to drive the feeding-out conveyer 22. The control device 200 is operable, when the upper surface 16D of the horizontal extended portion 16A of the table 16 is moved downwardly from an aftermentioned table upward-downward directional intermediate position VTX to the aftermentioned table downwardmost position VT2, to supply a blowing activation signal SB to the blower motor 174.

With reference to FIG. 2, respective movement ranges of the main ledge 14, the table 16, and the auxiliary ledges 18, 20 will be described below. In this embodiment, a right edge 14C of the horizontal extended portion 14A of the main ledge 14 is displaced between a main ledge rightwardmost position HM1 and a main ledge leftwardmost position HM2 in the rightward-leftward direction. A main ledge rightward-leftward directional intermediate position HMX is set between the main ledge rightwardmost position HM1 and the main ledge leftwardmost position HM2. A lower surface 14D of the horizontal extended portion 14A of the main ledge 14 is moved upwardly and downwardly between a main ledge upwardmost position VM1 and a main ledge downwardmost position VM2 in the upward-downward direction. A main ledge upward-downward directional intermediate position VMX is set between the main ledge upwardmost position VM1 and the main ledge downwardmost position VM2. The left edge 16C of the horizontal extended portion 16A of the table 16 is displaced between a table leftwardmost position HT1 and a table rightwardmost position HT2 in the rightward-leftward direction. The upper surface 16D of the horizontal extended portion 16A of the table 16 is displaced between a table upwardmost position VT1 and a table downwardmost position VT2 in the upward-downward direction. The table upward-downward directional intermediate position VTX is set between the table upwardmost position VT1 and the table downwardmost position VT2. A left edge of the upstream-side auxiliary ledge 18 is displaced between an auxiliary ledge advanced position HS1 where it is advanced into the hopper part HP, and an auxiliary ledge retracted position HS2 where it is retracted from the hopper part HP. Similarly, a right edge of the downstream-side auxiliary ledge 20 is displaced between an auxiliary ledge advanced position HS1 where it is advanced into the hopper part HP, and an auxiliary ledge retracted position HS2 where it is retracted from the hopper part HP. The auxiliary ledge advanced position HS1 and the auxiliary ledge retracted position HS2 of each of the auxiliary ledges 18, 20 are determined by a mechanical configuration and an installation position of a respective one of the ledge drive cylinders 124, 128. In this embodiment, the auxiliary ledge advanced position HS1 is in a state in which it is advanced into the hopper part HP to a position away from the auxiliary ledge retracted position HS2 by 100 mm.

The ROM of the control device 200 fixedly stores therein position information representing the main ledge upwardmost position VM1, the main ledge downwardmost position VM2, the main ledge upward-downward directional intermediate position VMX, and the table upwardmost position VT1. The ROM of the control device 200 fixedly stores therein a control program for calculating the main ledge rightwardmost position HM1, the main ledge leftwardmost position HM2, the main ledge rightward-leftward directional intermediate position HMX, the table leftwardmost position HT1, the table downwardmost position VT2, and the table upward-downward directional intermediate position VTX. In this embodiment, the ROM of the control device 200 fixedly stores therein a control program for determining the table rightwardmost position HT2 according to a timing at which the batch detector 180 generates the absence-of-batch detection signal SD.

In this embodiment, the main ledge rightwardmost position HM1 is represented by a value (LS—70) obtained by subtracting 70 mm from the conveyance-directional sheet length LS of the corrugated paperboard sheet SH, and is the position of the right edge 14C of the horizontal extended portion 14A of the main ledge 14, wherein this position is spaced rightwardly from the right surface of the forward contact plate 10 by a value equal to or less than 900 mm. The main ledge leftwardmost position HM2 is the position of the right edge 14C of the horizontal extended portion 14A of the main ledge 14, wherein this position is spaced leftwardly from the right surface of the forward contact plate 10 by 10 mm. The main ledge rightward-leftward directional intermediate position HMX is the position of the right edge 14C of the horizontal extended portion 14A of the main ledge 14, wherein this position is spaced rightwardly from the right surface of the forward contact plate 10 by a given distance DG indicated in FIG. 7. The given distance DG is a distance set to enable the lower surface 14D of the horizontal extended portion 14A of the main ledge 14 to guide left ends of the corrugated paperboard sheets SH in the batch BS to be placed on the feeding-out conveyer 22, to a position below the upper conveyer 24. The rightward-leftward directional position of the right surface of the forward contact plate 10 is set according to the conveyance-directional sheet length LS.

In this embodiment, the table leftwardmost position HT1 is the position of the left edge 16C of the horizontal extended portion 16A of the table 16, wherein this position is spaced leftwardly from the left surface of the backward restriction member 162 by a value which is ¾ of the conveyance-directional sheet length LS. The table downwardmost position VT2 is a position spaced downwardly by 5 mm from the upper surface of the upside of the feeding-out conveyer 22. The table upward-downward directional intermediate position VTX is a position spaced downwardly from the table upwardmost position VT1 by a value set according to the thickness of the batch BS, i.e., the sheet number of the batch BS, designated by an order. The position of the upper surface of the upside of the feeding-out conveyer 22 is a position spaced downwardly from a height position of lower ends of the rollers of the upper conveyer 24 by a value set according to a sheet number of the butch BS designated by an order.

[Operations and Functions of Counter-Ejector]

Operations and functions of the counter-ejector 1 according to this embodiment will be described below. First of all, the management device 300 supplies, to the counter-ejector control device 200, control instruction information necessary for executing a given order, such as information for directing the conveyance speed of the corrugated paperboard sheet SH, dimensions of the corrugated paperboard sheet SH, the number of the corrugated paperboard sheets SH to be processed, and others.

With reference to FIGS. 2 and 4 to 11, the operations and functions of the counter-ejector 1 will be described by taking a case where an order is executed in which, among various types of corrugated paperboard sheets SH which can be subjected to stacking and separating to be performed by the counter-ejector 1, five corrugated paperboard sheets SH each having the largest sheet length in the conveyance direction FD are stacked and separated as one batch BS. In this embodiment, the sheet length of the corrugated paperboard sheet SH in the conveyance direction FD is 1200 mm.

Before start of execution of this order, the control device 200 positions the forward contact plate 10 with respect to the correction plate 12 in the rightward-leftward direction, by controlling drive of the forward contact plate drive motor 42 according to the sheet length LS of the corrugated paperboard sheet SH in the conveyance direction FD. Further, the control device 200 positions the feeding-out conveyer 22 and the retention conveyer 26 with respect to the upper conveyer 24 in the upward-downward direction, by controlling drive of the conveyer upward-downward movement motor 142 according to the sheet number of the batch BS. The position of the right end of the upper conveyer 24 coupled to the forward contact plate support block 46 is changed in the rightward-leftward direction in conformity to the position of the forward contact plate 10.

Figure 4:
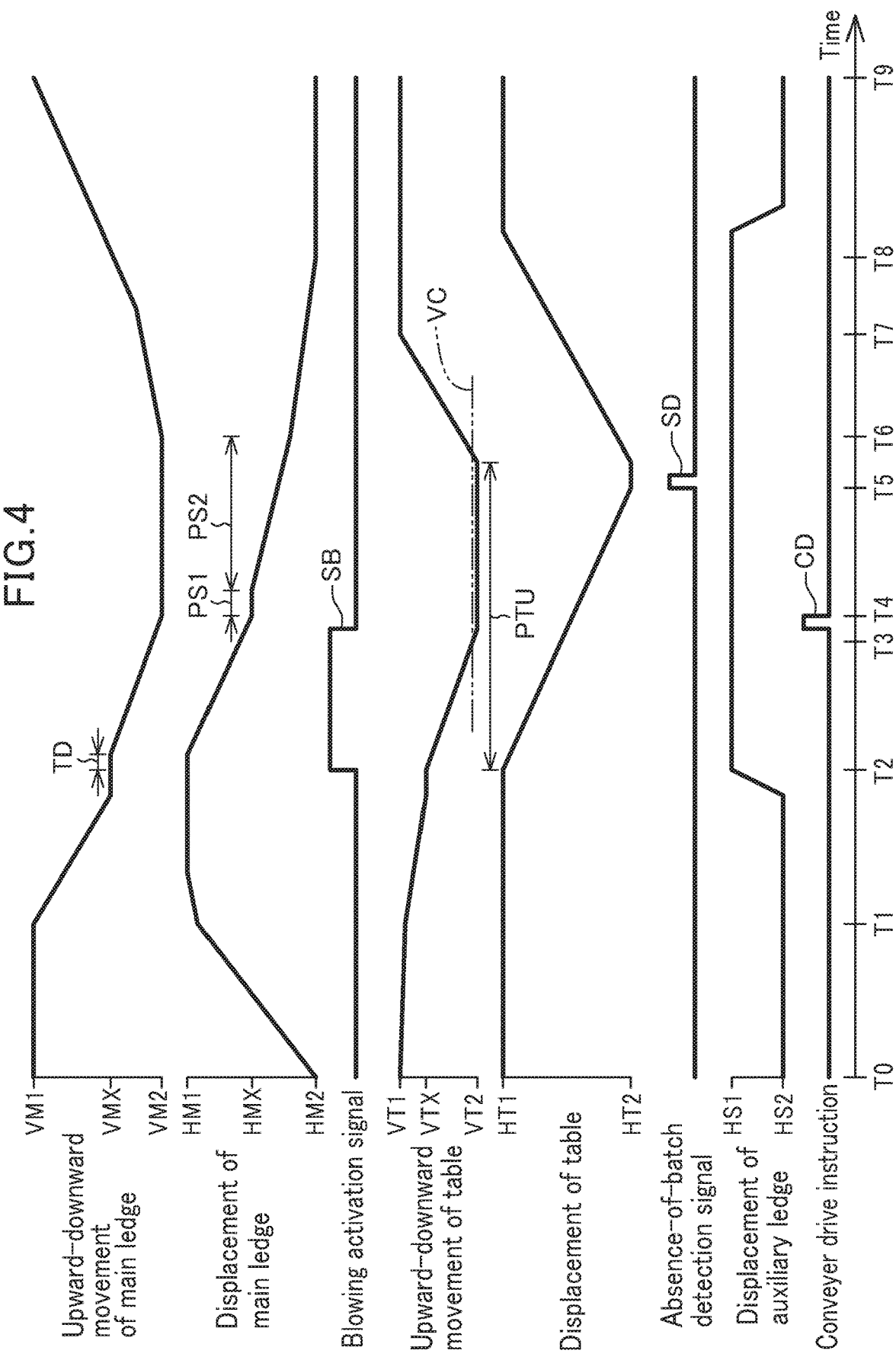
FIG. 4 is a timing chart depicting respective displacements of the main ledge 14, the table 16, and the auxiliary ledges 18, 20.

FIG. 4 is a timing chart depicting respective displacements of the main ledge 14, the table 16, and the auxiliary ledges 18, 20. From time T0 indicated in FIG. 4, the operation of the counter-ejector 1 is started. At the time T0, the lower surface 14D of the horizontal extended portion 14A of the main ledge 14 is located at the main ledge upwardmost position VM1. The control device 200 controls drive of the ledge displacement motor 64 to start displacement of the right edge 14C of the horizontal extended portion 14A of the main ledge 14 rightwardly from the main ledge leftwardmost position HM2 toward the main ledge rightwardmost position HM1. Further, the control device 200 controls drive of the table upward-downward movement motor 108 to start downward movement of the upper surface 16D of the horizontal extended portion 16A of the table 16 from the table upwardmost position VT1 toward the table upward-downward directional intermediate position VTX. The left edge 16C of the horizontal extended portion 16A of the table 16 is located at a position spaced from the left surface of the backward restriction member 162 by a value which is ¾ of the sheet length LS of the corrugated paperboard sheet SH in the conveyance direction FD, i.e., the table leftwardmost position HT1. At the time T0, each of the auxiliary ledges 18, 20 is located at the auxiliary ledge retracted position HS2, and the air blower 170 is in a state in which its blowing operation is stopped.

FIG. 2 depicts a state in which the batch BS formed in a previous processing cycle of the counter-ejector 1 is placed on the table 16. The state depicted in FIG. 2 is a state at time T1 indicated in FIG. 4. At the time T1, the lower surface 14D of the horizontal extended portion 14A of the main ledge 14 is located at the main ledge upwardmost position VM1, and the right edge 14C of the horizontal extended portion 14A of the main ledge 14 is located at a position slightly leftward of the main ledge rightwardmost position HM1. The state of the main ledge 14 depicted in FIG. 2 is a standby state of the main ledge 14. At the time T1, the left edge 16C of the horizontal extended portion 16A of the table 16 is located at the table leftwardmost position HT1, and the upper surface 16D of the horizontal extended portion 16A of the table 16 is located at a position slightly below the table upwardmost position VT1. Each of the auxiliary ledges 18, 20 is located at a respective one of the auxiliary ledge retracted positions HS2. At the time T1, the batch detector 180 is in a state in which it detects the presence of the batch BS placed on the table 16, but has not generated the absence-of-batch detection signal SD.

In response to the elapse of a given time period from detection of the forward edge of a last one of the corrugated paperboard sheets SH of the previous batch BS by the sheet detector 182 through until the forward edge of the last corrugated paperboard sheet SH, i.e., the 5th corrugated paperboard sheet SH, reaches the right surface of the forward contact plate 10, the main ledge 14 starts to be moved downwardly from the main ledge upwardmost position VM1 toward the main ledge upward-downward directional intermediate position VMX. At this time of start of the downward movement, the main ledge 14 continues rightward displacement toward the main ledge rightwardmost position HM1. The table 16 continues downward movement toward the table upward-downward directional intermediate position VTX, while being held at the table leftwardmost position HT1 in the rightward-leftward direction.

Figure 5:
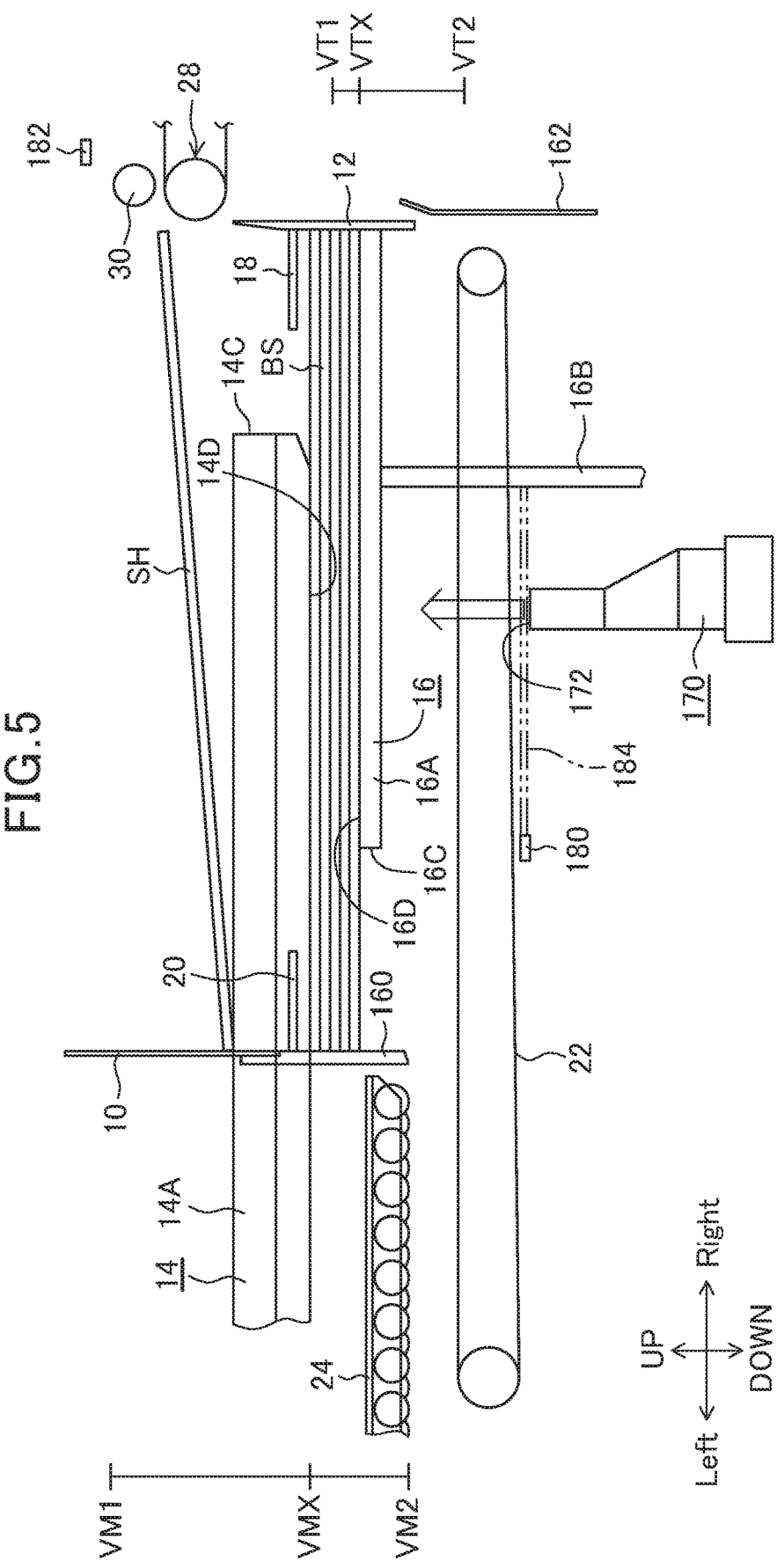
FIG. 5 is an explanatory diagram depicting a state in which, at time T2 indicated in the timing chart in FIG. 4, an upper surface 16D of a horizontal extended portion 16A of the table 16 starts to be moved downwardly from a table upward-downward directional intermediate position VTX toward a table downwardmost position VT2, and a left edge 16C of the horizontal extended portion 16A of the table 16 starts to be displaced rightwardly from a table leftwardmost position HT1 toward a table rightwardmost position HT2.

When the lower surface 14D of the horizontal extended portion 14A of the main ledge 14 is moved downwardly to the main ledge upward-downward directional intermediate position VMX, and the upper surface 16D of the horizontal extended portion 16A of the table 16 is moved downwardly to the table upward-downward directional intermediate position VTX, the control device 200 operates to drive the ledge drive cylinders 124, 128 to displace each of the auxiliary ledges 18, 20 toward the auxiliary ledge advanced position HS1. FIG. 5 depicts a state in which, at time T2 indicated in FIG. 4, each of the auxiliary ledges 18, 20 is displaced to the auxiliary ledge advanced position HS1.

At the time T2, the control device 200 operates to generate start drive of the blowing activation signal SB to start drive of the blower motor 174. Upon drive of the blower motor 174, the air blower 170 blows air from the blowing port 172 toward the batch BS placed on the table 16. At the time T2, the batch detector 180 is still in the state in which it detects the presence of the batch BS placed on the table 16, but has not generated the absence-of-batch detection signal SD.

At the time T2, the control device 200 controls drive of the table upward-downward movement motor 108 to move the table 16 downwardly from the table upward-downward directional intermediate position VTX toward the table downwardmost position VT2. Further, at the time T2, the control device 200 controls drive of the table displacement motor 96 to displace the table 16 rightwardly from the table leftwardmost position HT1 toward the table rightwardmost position HT2.

At a time just after the elapse of a delay time period TD from the time T2, the control device 200 control drive of the ledge upward-downward movement motor 76 to move the main ledge 14 downwardly from the main ledge upward-downward directional intermediate position VMX toward the main ledge downwardmost position VM2. Further, at the time just after the elapse of the delay time period TD, the control device 200 control drive of the ledge displacement motor 64 to move the main ledge 14 leftwardly from the main ledge rightwardmost position HM1 toward the main ledge rightward-leftward directional intermediate position HMX.

Figure 6:
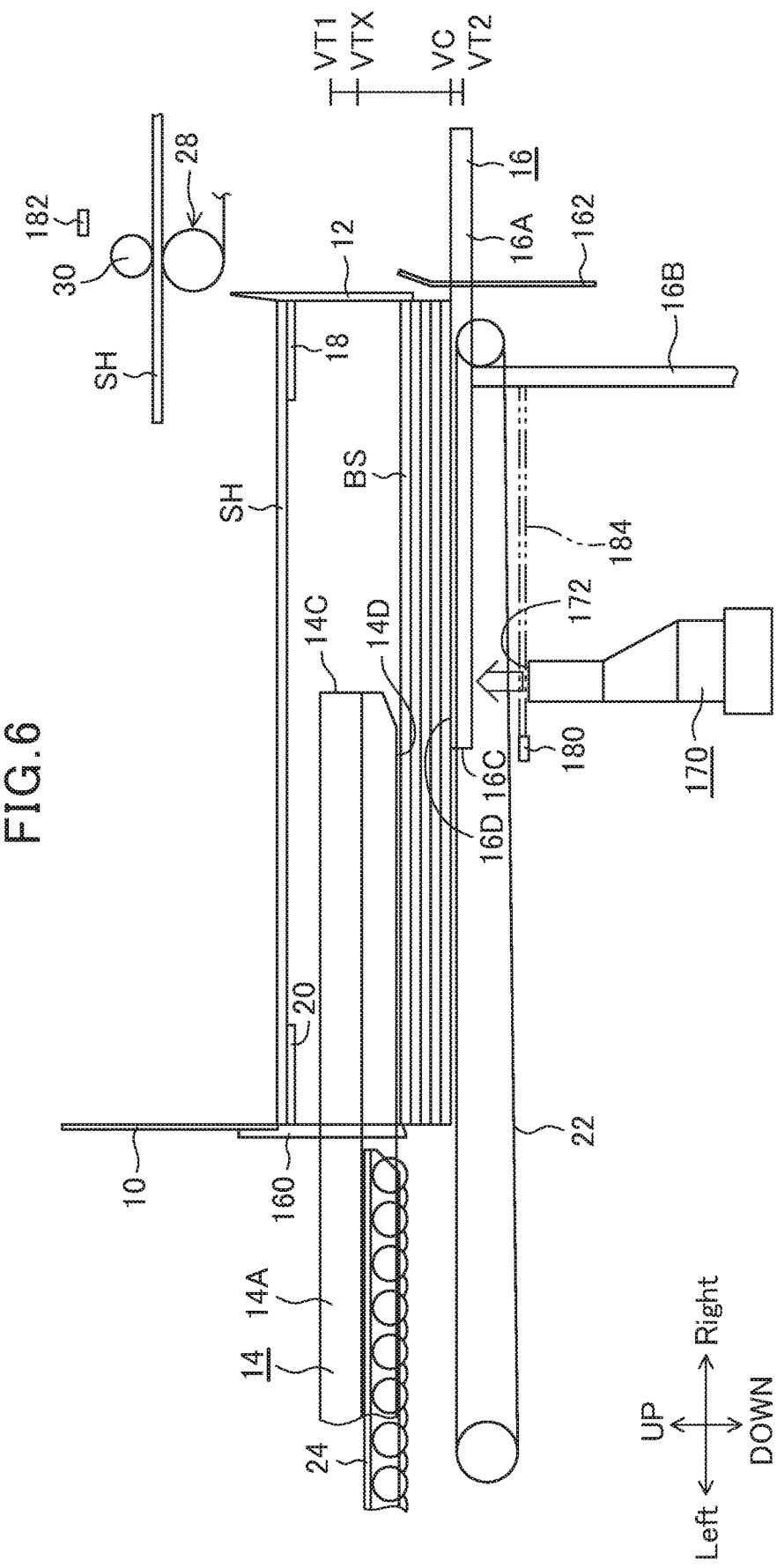
FIG. 6 is an explanatory diagram depicting a state in which, at time T3 indicated in the timing chart in FIG. 4, the upper surface 16D of the horizontal extended portion 16A of the table 16 reaches a position VC upward by 10 mm from the position of an upside of a feeding-out conveyer 22.

FIG. 6 depicts a state in which, at time T3 indicated in FIG. 4, the upper surface 16D of the horizontal extended portion 16A of the table 16 reaches a position VC upward by 10 mm from the position of the upside of the feeding-out conveyer 22.

Figure 7:
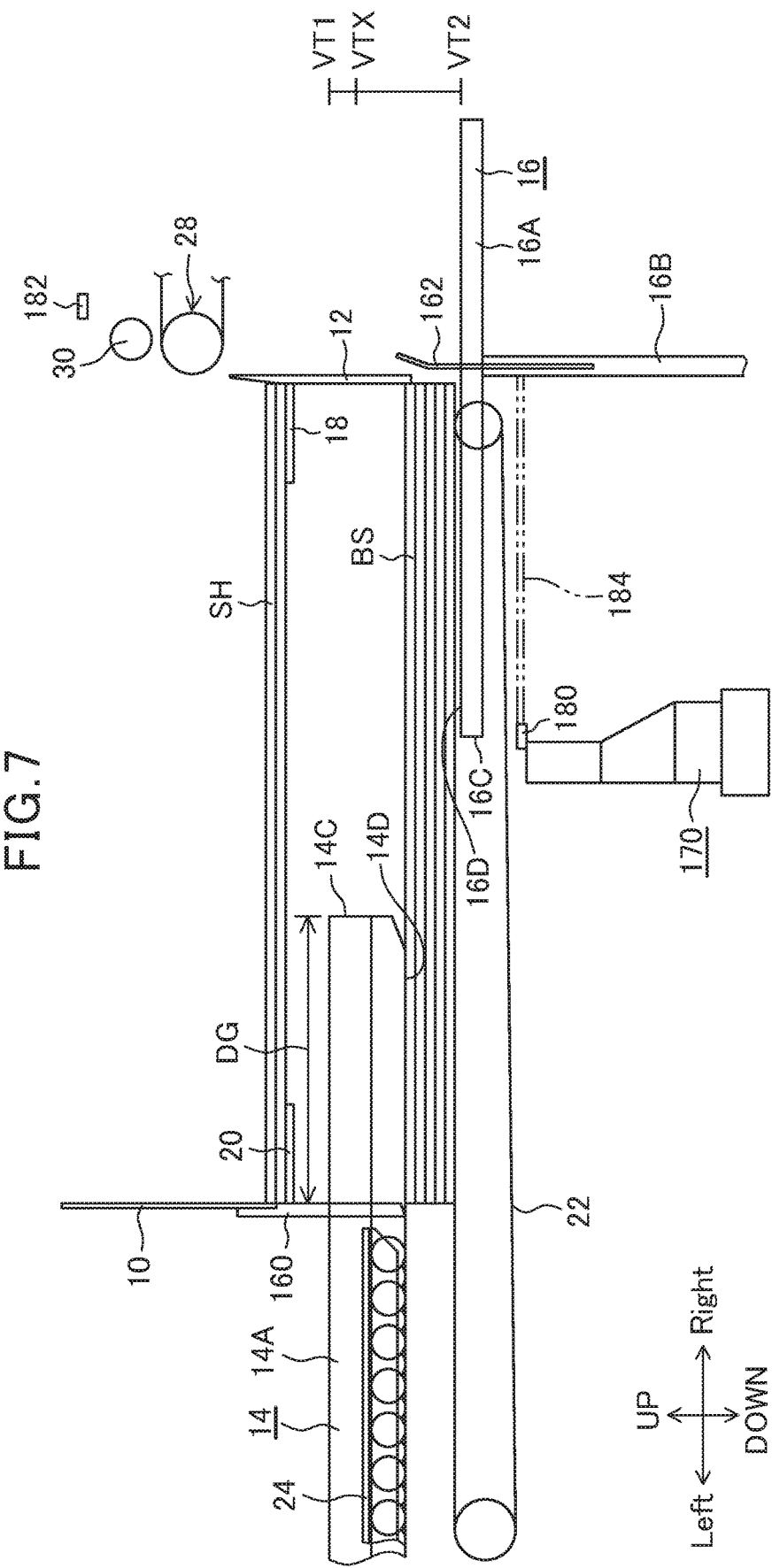
FIG. 7 is an explanatory diagram depicting a state in which, at time T4 indicated in the timing chart in FIG. 4, a lower surface 14D of a horizontal extended portion 14A of the main ledge 14 reaches a main ledge downwardmost position VM2, and a right edge 14C of the horizontal extended portion 14A of the main ledge 14 reaches a main ledge rightward-leftward directional intermediate position HMX.

FIG. 7 depicts a state in which, at time T4 indicated in FIG. 4, the lower surface 14D of the horizontal extended portion 14A of the main ledge 14 reaches the main ledge downwardmost position VM2, and the right edge 14C of the horizontal extended portion 14A of the main ledge 14 reaches the main ledge rightward-leftward directional intermediate position HMX. When the right edge 14C of the horizontal extended portion 14A of the main ledge 14 reaches the main ledge rightward-leftward directional intermediate position HMX, the right edge 14C of the horizontal extended portion 14A is in a state in which it is advanced into the hopper part HP to a position away rightwardly from the right surfaces of the forward contact plate 10 and the forward restriction member 160 by the given distance DG. Although the upper surface 16D of the horizontal extended portion 16A of the table 16 reaches the table downwardmost position VT2 at a time slightly earlier than the time T4, the left edge 16C of the horizontal extended portion 16A of the table 16 continues rightward displacement toward the table rightwardmost position HT2.

When the upper surface 16D of the horizontal extended portion 16A of the table 16 reaches the table downwardmost position VT2 at the time slightly earlier than the time T4, the control device 200 operates to stop generation of the blowing activation signal SB to thereby stop drive of the blower motor 174. Upon stop of the blower motor 174, the air blower 170 stops air blowing toward the batch BS located on the upper side of the horizontal extended portion 16A of the table 16. Further, at the time slightly earlier than the time T4, the control device 200 operates to generate the conveyer drive instruction CD and supply the conveyer drive instruction CD to the feeding-out motor 146. According to the conveyer drive instruction CD, drive of the feeding-out motor 146 is started. Generally, there is a given response lag from supply of the conveyer drive instruction CD to the feeding-out motor 146 through until the feeding-out conveyer 22 actually conveys the batch BS leftwardly.

The control device 200 operates to inhibit the right edge 14C of the horizontal extended portion 14A of the main ledge 14 from being displaced leftwardly, until a given displacement inhibition time period PS1 elapses from the time T4. The given displacement inhibition time period PS1 is set to a value sufficiently greater than the given response lag of the feeding-out conveyer 22. In response to the elapse of the given displacement inhibition time period PS1, the control device 200 controls drive of the ledge displacement motor 64 to displace the main ledge 14 leftwardly from the main ledge rightward-leftward directional intermediate position HMX toward the main ledge leftwardmost position HM2. Because the given displacement inhibition time period PS1 is set to a value sufficiently greater than the given response lag, this leftward displacement of the main ledge 14 is performed when the feeding-out conveyer 22 actually starts to convey the batch BS. Further, the leftward displacement of the main ledge 14 is performed after the elapse of the given displacement inhibition time period PS1 and at least in a given upward-downward movement inhibition time period PS2 during which the main ledge 14 is located at the main ledge downwardmost position VM2. The given upward-downward movement inhibition time period PS2 is a time period from a time just after the elapse of the given displacement inhibition time period PS1 to aftermentioned time T6. The left end of the batch BS being conveyed by the feeding-out conveyer 22 is guided to a lower side of the rollers of the upper conveyer 24 by the lower surface 14D of the horizontal extended portion 14A of the main ledge 14 being displaced leftwardly.

Figure 8:
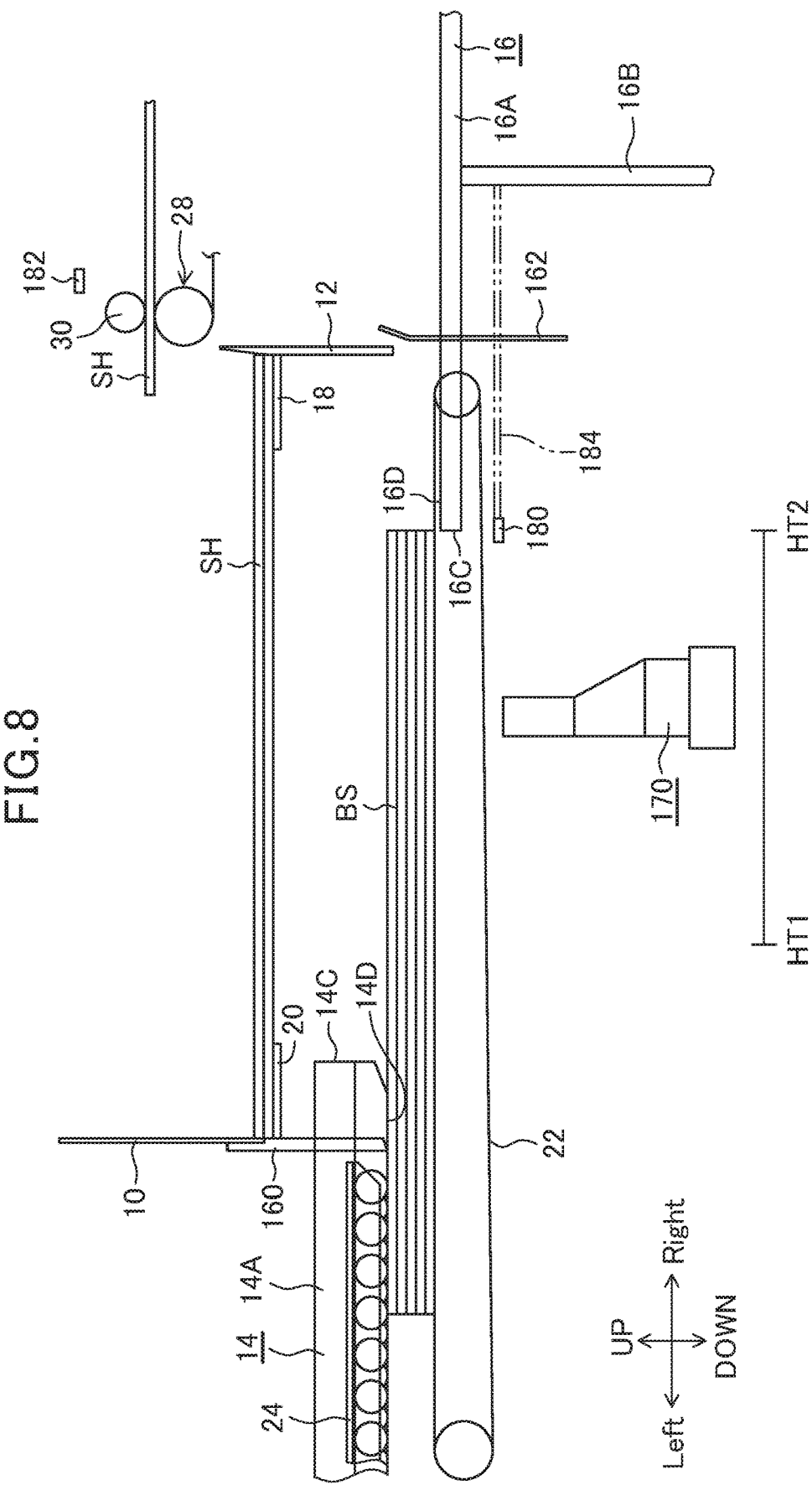
FIG. 8 is an explanatory diagram depicting a state in which, at time T5 indicated in the timing chart in FIG. 4, a batch BS is conveyed by the feeding-out conveyer 22, so that it disappears from the upper side of the upper surface 16D of the horizontal extended portion 16A of the table 16.

FIG. 8 depicts a state in which, at time T5 indicated in FIG. 4, the batch BS is conveyed by the feeding-out conveyer 22, so that it disappears from the upper side of the upper surface 16D of the horizontal extended portion 16A of the table 16. At the time T5, the batch detector 180 generates the absence-of-batch detection signal SD and supplies the absence-of-batch detection signal SD to the control device 200. When the absence-of-batch detection signal SD is generated, the left edge 16C of the horizontal extended portion 16A of the table 16 is located at the table rightwardmost position HT2. In response to receiving the absence-of-batch detection signal SD, the control device 200 operates to stop rightward displacement of the table 16. After the rightward displacement of the table 16 is stopped, the control device 200 controls drive of the table upward-downward movement motor 108 to move the table 16 upwardly from the table downwardmost position VT2 toward the table upwardmost position VT1, and controls drive of the table displacement motor 96 to displace the table 16 from the table rightwardmost position HT2 toward the table leftwardmost position HT1.

Figure 9:
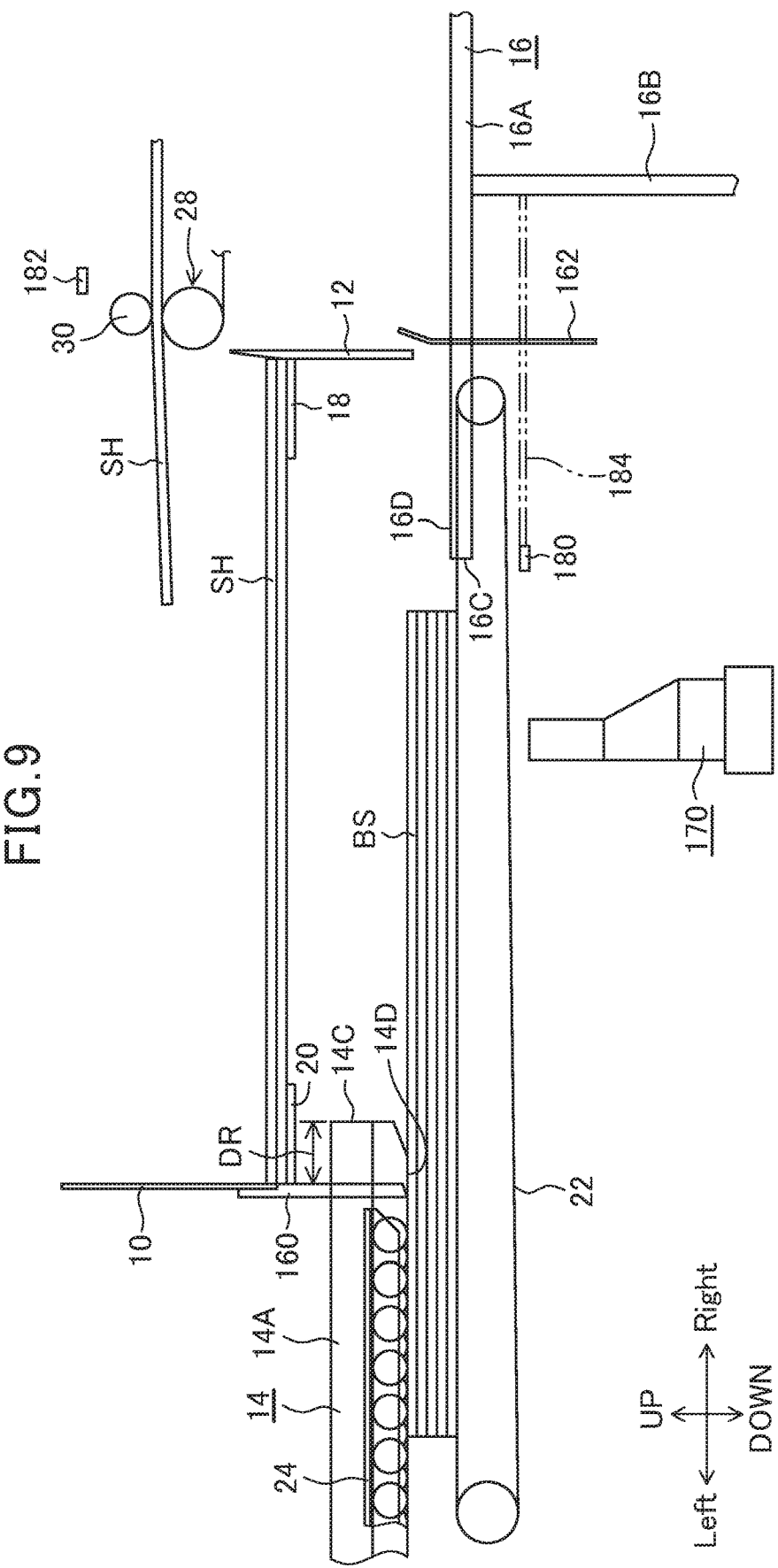
FIG. 9 is an explanatory diagram depicting a state in which, at time T6 indicated in the timing chart in FIG. 4, the right edge 14C of the horizontal extended portion 14A of the main ledge 14 reaches a position spaced by a given distance DR rightwardly from respective right surfaces of the forward contact plate 10 and a forward restriction member 160.

FIG. 9 depicts a state in which, at time T6 indicated in FIG. 4, the right edge 14C of the horizontal extended portion 14A of the main ledge 14 reaches a position spaced by a given distance DR rightwardly from the right surfaces of the forward contact plate 10 and the forward restriction member 160. This given distance DR is a distance set to prevent the right edge 14C of the horizontal extended portion 14A of the main ledge 14 from coming into collision with the corrugated paperboard sheet SH placed on and supported by the auxiliary ledges 18, 20 when the main ledge 14 is moved upwardly. The given distance DR is preliminarily fixedly stored in the ROM of the control device 200. When the right edge 14C of the horizontal extended portion 14A reaches a position spaced by the given distance DR rightwardly from the right surfaces of the forward contact plate 10 and the forward restriction member 160 at the time T6, the control device 200 control drive of the ledge upward-downward movement motor 76 to move the main ledge 14 from the main ledge downwardmost position VM2 toward the main ledge upwardmost position VM1.

Figure 10:
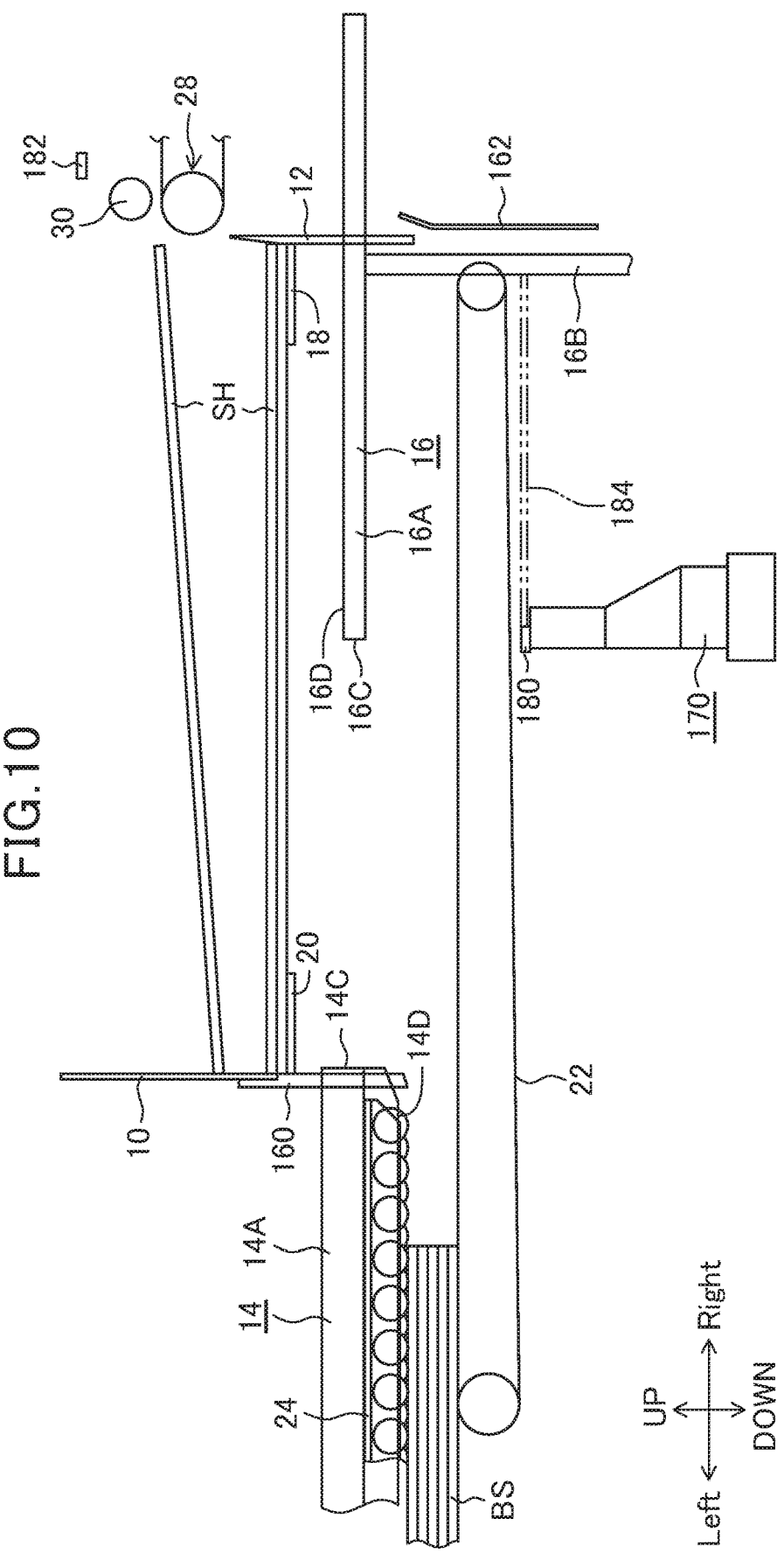
FIG. 10 is an explanatory diagram depicting a state in which, at time T7 indicated in the timing chart in FIG. 4, the upper surface 16D of the horizontal extended portion 16A of the table 16 reaches a table upwardmost position VT1.

FIG. 10 depicts a state in which, at time T7 indicated in FIG. 4, the upper surface 16D of the horizontal extended portion 16A of the table 16 reaches the table upwardmost position VT1. At the time T7, the left edge 16C of the horizontal extended portion 16A of the table 16 continues leftward displacement toward the table leftwardmost position HT1. Further, at the time T7, the main ledge 14 continues upward movement toward the main ledge upwardmost position VM1 and continues displacement toward the main ledge leftwardmost position HM2.

Figure 11:
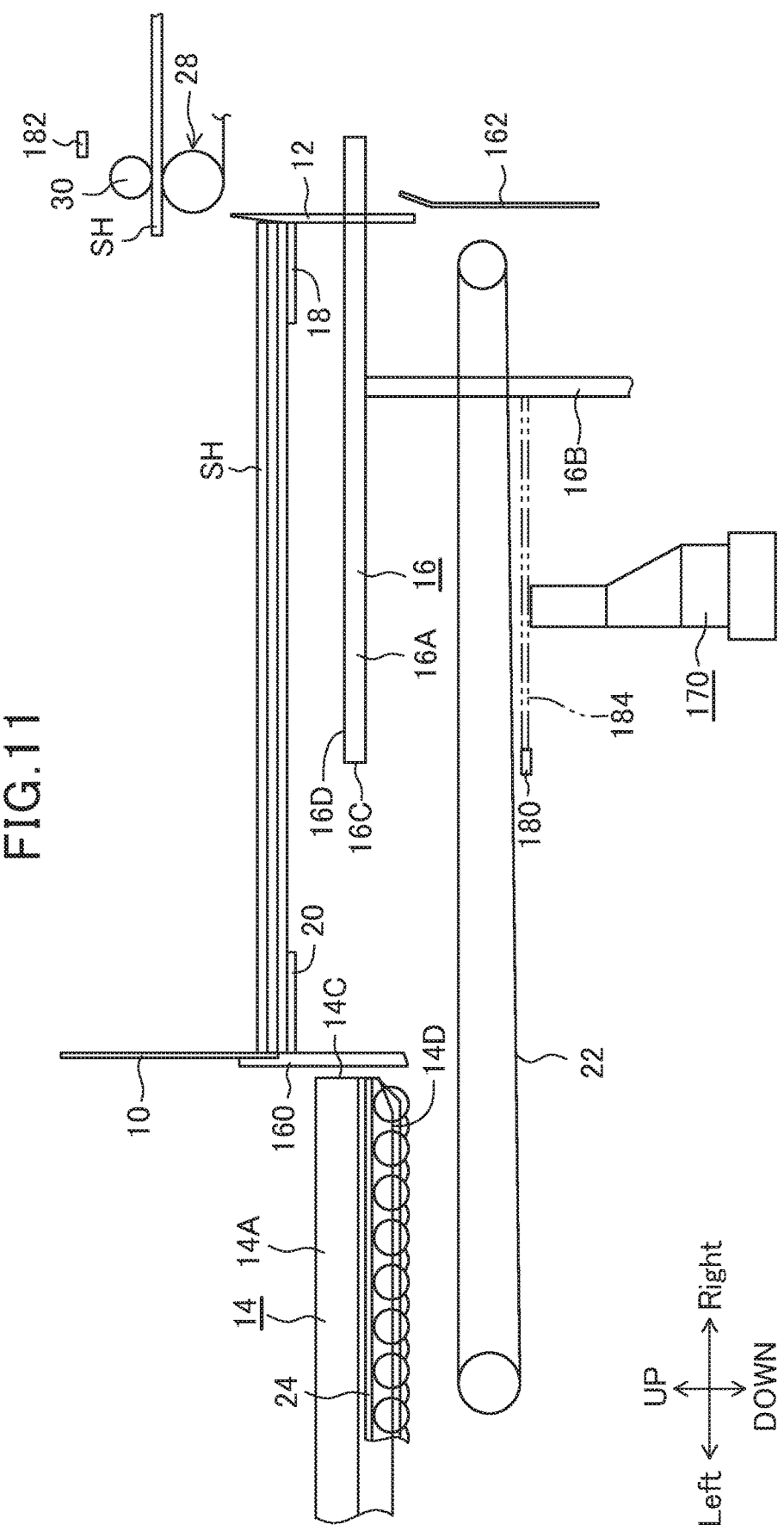
FIG. 11 is an explanatory diagram depicting a state in which, at time T8 indicated in the timing chart in FIG. 4, the right edge 14C of the horizontal extended portion 14A of the main ledge 14 reaches a main ledge leftwardmost position HM2.

FIG. 11 depicts a state in which, at time T8 indicated in FIG. 4, the right edge 14C of the horizontal extended portion 14A of the main ledge 14 reaches the main ledge leftwardmost position HM2. At the time T8, the main ledge 14 continues upward movement toward the main ledge upwardmost position VM1. At a time after the time T8, the left edge 16C of the horizontal extended portion 16A of the table 16 reaches the table leftwardmost position HT1.

When the left edge 16C of the horizontal extended portion 16A of the table 16 reaches the table leftwardmost position HT1, the control device 200 operates to stop drive of the ledge drive cylinders 124, 128 to thereby displace each of the auxiliary ledges 18, 20 toward the auxiliary ledge retracted position HS2. Through the operation of displacing each of the auxiliary ledges 18, 20 toward the auxiliary ledge retracted position HS2, the corrugated paperboard sheets SH placed on and supported by the auxiliary ledges 18, 20 are transferred to the table 16.

When the lower surface 14D of the horizontal extended portion 14A of the main ledge 14 is moved upwardly to the main ledge upwardmost position VM1 at time T9 indicated in FIG. 4, the control device 200 controls drive of the ledge displacement motor 64 to start rightward displacement of the right edge 14C of the horizontal extended portion 14A of the main ledge 14 from the main ledge leftwardmost position HM2 toward the main ledge rightwardmost position HM1, as with the operation at the time T0.

[Advantageous Effects of Embodiment]

In this embodiment, after the left edge 16C of the horizontal extended portion 16A of the table 16 is positioned at the table leftwardmost position HT1 set based on the sheet length LS of the corrugated paperboard sheet SH in the conveyance direction FD, as depicted in FIG. 2, the table 16 is displaced rightwardly toward the table rightwardmost position HT2 along with downward movement of the upper surface 16D of the horizontal extended portion 16A of the table 16. Therefore, it becomes possible to advance a timing at which the batch BS conveyed by the feeding-out conveyer 22 disappears from the upper side of the upper surface 16D of the horizontal extended portion 16A of the table 16, and thus advance a timing at which the upper surface 16D of the horizontal extended portion 16A of the table 16 starts to be moved upwardly from the table downwardmost position VT2 toward the table upwardmost position VT1. In other words, it becomes possible to shorten a time period PTU from the time T2 to a time when the table 16 starts to be moved upwardly from the table downwardmost position VT2 after the time T5.

In this embodiment, after the table 16 receives the given number of the corrugated paperboard sheets SH from the auxiliary ledges 18, 20, the left edge 16C of the horizontal extended portion 16A of the table 16 is displaced rightwardly toward the table rightwardmost position HT2 along with downward movement of the upper surface 16D of the horizontal extended portion 16A of the table 16. The backward restriction member 162 restricts a situation where the corrugated paperboard sheets SH placed on and supported by the horizontal extended portion 16A of the table 16 is displaced rightwardly along rightward displacement of the table 16, due to a frictional resistance with the upper surface 16D of the horizontal extended portion 16A of the table 16. Therefore, it becomes possible to prevent breaking of a stacked posture of the corrugated paperboard sheets SH, i.e., the batch BS, placed on and supported by the table 16.

In this embodiment, when the lower surface 14D of the horizontal extended portion 14A of the main ledge 14 is moved downwardly from the main ledge upward-downward directional intermediate position VMX to the main ledge downwardmost position VM2 in the time period between the time T2 and the time T4, the right edge 14C of the horizontal extended portion 14A of the main ledge 14 is displaced leftwardly the main ledge rightwardmost position HM1 to the main ledge rightward-leftward directional intermediate position HMX. Therefore, it becomes possible to advance a timing (i.e., the time T6) at which the right edge 14C of the horizontal extended portion 14A of the main ledge 14 reaches a position spaced rightwardly by the given distance DR from the right surfaces of the forward contact plate 10 and the forward restriction member 160, and thus advance a timing at which the lower surface 14D of the horizontal extended portion 14A of the main ledge 14 starts to be moved upwardly the main ledge downwardmost position VM2 toward the main ledge upwardmost position VM1.

In this embodiment, the lower surface 14D of the horizontal extended portion 14A of the main ledge 14 is moved downwardly from the main ledge upward-downward directional intermediate position VMX toward the main ledge downwardmost position VM2, while sandwiching the batch BS in cooperation with the upper surface 16D of the horizontal extended portion 16A of the table 16, as depicted in FIG. 5. Along with this downward movement of the main ledge 14, the right edge 14C of the horizontal extended portion 14A of the main ledge 14 is displaced leftwardly from the main ledge rightwardmost position HM1 to the main ledge rightward-leftward directional intermediate position HMX. The forward restriction member 160 restricts a situation where the batch BS placed on and supported by the horizontal extended portion 16A of the table 16 is displaced leftwardly along leftward displacement of the main ledge 14, due to a frictional resistance with the lower surface 14D of the horizontal extended portion 14A of the main ledge 14. Therefore, it becomes possible to prevent breaking of the stacked posture of the batch BS placed on and supported by the table 16.

In this embodiment, at the time T2, the upper surface 16D of the horizontal extended portion 16A of the table 16 is in a state in which it sandwiches the batch BS in cooperation with the lower surface 14D of the horizontal extended portion 14A of the main ledge 14, as depicted in FIG. 5. At the time T2, the upper surface 16D of the horizontal extended portion 16A of the table 16 starts to be moved downwardly from the table upward-downward directional intermediate position VTX toward the table downwardmost position VT2, and the left edge 16C of the horizontal extended portion 16A of the table 16 starts to be displaced rightwardly from the table leftwardmost position HT1 toward the table rightwardmost position HT2. At a time just after the elapse of the delay time period TD from the time T2, the lower surface 14D of the horizontal extended portion 14A of the main ledge 14 starts to be moved downwardly from the main ledge upward-downward directional intermediate position VMX toward the main ledge downwardmost position VM2. As a result, the upper surface 16D of the horizontal extended portion 16A of the table 16 starts to be moved downwardly at a timing earlier by the delay time period TD than the lower surface 14D of the horizontal extended portion 14A of the main ledge 14, so that the pressing force applied from the lower surface 14D of the horizontal extended portion 14A of the main ledge 14 to the batch BS is reduced, and thus the frictional resistance between the upper surface 16D of the horizontal extended portion 16A of the table 16 and the lower surface of the batch BS is reduced. Based on this reduction in the frictional resistance, it becomes possible to prevent breaking of the stacked posture of the batch BS placed on and supported by the table 16, when the left edge 16C of the horizontal extended portion 16A of the table 16 is displaced rightwardly.

In this embodiment, the control device 200 continuously generates the blowing activation signal SB in the time period from the time T2 to the time T4, as depicted in FIG. 4. In the time period from the time T2 to the time T4, the upper surface 16D of the horizontal extended portion 16A of the table 16 is moved downwardly from the table upward-downward directional intermediate position VTX toward the table downwardmost position VT2. According to the blowing activation signal SB, the air blower 170 blows air toward the horizontal extended portion 16A of the table 16 being moved downwardly. Therefore, the batch BS placed on and supported by the table 16 receives a blowing force from the air blower 170, so that the frictional resistance between the upper surface 16D of the horizontal extended portion 16A of the table 16 and the lower surface of the batch BS is further reduced. Based on this further reduction in the frictional resistance, it becomes possible to prevent breaking of the stacked posture of the batch BS placed on and supported by the table 16, when the left edge 16C of the horizontal extended portion 16A of the table 16 is displaced rightwardly.

In this embodiment, at the time T5 when the batch BS is conveyed by the feeding-out conveyer 22, so that it disappears from the upper side of the upper surface 16D of the horizontal extended portion 16A of the table 16, the batch detector 180 generate the absence-of-batch signal SD and supplies the absence-of-batch signal SD to the control device 200. In response to receiving the absence-of-batch signal SD, the control device 200 operates to stop rightward displacement of the table 16. After the rightward displacement of the table 16 is stopped, the control device 200 controls drive of the table upward-downward movement motor 108 to move the table 16 upwardly from the table downwardmost position VT2 toward the table upwardmost position VT1, and controls the table displacement motor 96 to displace the table 16 from the table rightwardmost position HT2 toward the table leftwardmost position HT1. Therefore, it becomes possible to advance a timing at which the table 16 starts to be moved upwardly toward the table upwardmost position VT1, to a time close to the time T5 when the batch BS disappears from the upper side of the upper surface 16D of the horizontal extended portion 16A, and thus prevent this timing from being delayed until the left edge 16C of the horizontal extended portion 16A is displaced rightwardly to right surfaces of the correction plate 12 and the backward restriction member 162.

In this embodiment, in the time period from the time T2 to the time T4, i.e., a time period during which the upper surface 16D of the horizontal extended portion 16A of the table 16 is moved downwardly from the table upward-downward directional intermediate position VTX to the table downwardmost position VT2, the control device 200 controls the table displacement motor 96 to displace the left edge 16C of the horizontal extended portion 16A of the table 16 rightwardly toward the table rightwardmost position HT2. Therefore, the left edge 16C of the horizontal extended portion 16A of the table 16 is gradually displaced rightwardly, over the entire time period from the time T2 to the time T4, so that it becomes possible to prevent breaking of the stacked posture of the batch BS on the table 16.

In this embodiment, in a time period during which the upper surface 16D of the horizontal extended portion 16A of the table 16 is moved upwardly from the table downwardmost position VT2 to the table upwardmost position VT1 across the table upward-downward directional intermediate position VTX, i.e., in a time period from a time just after the elapse of the time period PTU from the time T2 to a time when the table 16 starts to be moved upwardly from the table downwardmost position VT2 after the time T5, to the time T7, the control device 200 controls drive of the table displacement motor 96 to displace the left edge 16C of the horizontal extended portion 16A of the table 16 leftwardly toward the table leftwardmost position HT1. As a result, the upward movement and the leftward displacement of the table 16 are simultaneously performed, so that it becomes possible to advance a timing at which the table 16 receives the next batch to thereby speed up the entire operation of the counter-ejector 1, as compared to a case where the upward movement and the leftward displacement of the table 16 are performed, respectively, in different time periods.

In this embodiment, the control device 200 operates to generate the conveyer drive instruction CD when the upper surface 16D of the horizontal extended portion 16A of the table 16 is moved downwardly to the table downwardmost position VT2, to start drive of the feeding-out motor 146. During the given displacement inhibition time period PS1 starting from the time T4 which is a time after the generation of the conveyer drive instruction CD, the control device 200 inhibits the main ledge 14 from being displaced leftwardly in the state in which the main ledge 14 is in contact with the batch BS on the feeding-out conveyer 22 from thereabove. After the elapse of the given displacement inhibition time period PS1, the control device 200 operates to displace the right edge 14C of the horizontal extended portion 14A of the main ledge 14 leftwardly at least during the given upward-downward movement inhibition time period PS2. In a time period from the time T6 just after the elapse of the given upward-downward movement inhibition time period PS2 to the time T8, i.e., at least part of a time period during which the main ledge 14 is moved upwardly toward the main ledge upwardmost position VM1, the control device 200 operates to displace the right edge 14C of the horizontal extended portion 14A of the main ledge 14 leftwardly. As a result, only during the given displacement inhibition time period PS1, the main ledge 14 is inhibited from being displaced leftwardly in the state in which it is in contract with the batch BS on the feeding-out conveyer 22 before start of the feeding-out operation, from thereabove, so that it becomes possible to prevent the situation where only the main ledge 14 is displaced leftwardly before the feeding-out operation of the feeding-out conveyer 22, thereby leading to breaking of the stacked posture of the batch BS. Further, the main ledge 14 is displaced leftwardly under the condition that it is stopped at the main ledge downwardmost position VM2 only in the upward-downward movement inhibition time period PS2, so that it becomes possible to smoothly move a left end of the batch BS being fed out by the feeding-out conveyer 22, from the lower surface 14D of the horizontal extended portion 14A of the main ledge 14 to the lower surface of the upper conveyer 24.

In this embodiment, over the entire time period during which the lower surface 14D of the horizontal extended portion 14A of the main ledge 14 is moved downwardly from the main ledge upward-downward directional intermediate position VMX to the main ledge downwardmost position VM2, i.e., over the entire time period from a time just after the elapse of the delay time period TD to the time T4, the control device 200 operates to displace the right edge 14C of the horizontal extended portion 14A of the main ledge 14 leftwardly. As a result, the downward movement and the leftward displacement of the main ledge 14 are simultaneously performed, so that it becomes possible to advance a timing at which the main ledge 14 returns to the main ledge upwardmost position VM1 so as to form the next batch to thereby speed up the entire operation of the counter-ejector 1, as compared to a case where the downward movement and the leftward displacement of the main ledge 14 are performed, respectively, in different time periods.

<Corresponding Relationships in Configuration>

The counter-ejector 1 is one example of the counter-ejector set forth in the appended claims. Each of the forward contact plate 10 and the correction plate 12 is one example of a respective one of the forward contact plate and the correction plate set forth in the appended claims. The main ledge 14 is one example of the ledge set forth in the appended claims. Each of the table 16 and the elevator 90 is one example of a respective one of the table and the elevator set forth in the appended claims. Each of the feeding-out conveyer 22 and the upper conveyer 24 is one example of a respective one of the feeding-out conveyer and the upper conveyer set forth in the appended claims. Each of the ledge displacement motor 64 and the ledge upward-downward movement motor 76 is one example of a respective one of the ledge displacement device and the ledge upward-downward movement device set forth in the appended claims. Each of the table displacement motor 96 and the table upward-downward movement motor 108 is one example of a respective one of the table displacement device and the table upward-downward movement device set forth in the appended claims. Each of the forward restriction member 160 and the backward restriction member 162 is one example of a respective one of the forward restriction member and the backward restriction member set forth in the appended claims. The air blower 170 comprising the blower motor 174 is one example of the air blower set forth in the appended claims. The batch detector 180 is one example of the detector set forth in the appended claims. The counter-ejector control device 200 is one example of the control device set forth in the appended claims. Each of the corrugated paperboard sheet SH and the batch BS is one example of a respective one the corrugated paperboard sheet and the batch set forth in the appended claims. The conveyance direction FD is one example of the given conveyance direction set forth in the appended claims. The hopper part HP is one example of the hopper part set forth in the appended claims. The processing in which, in the time period PTU from the time T2 to a time when the table 16 starts to be moved upwardly from the table downwardmost position VT2 after the time T5, the counter-ejector control device 200 controls drive of each of the table displacement motor 96 and the table upward-downward movement motor 108 is one example of the table downward movement control processing set forth in the appended claims. The processing in which, in the time period from a time just after the elapse of the time period PTU to the time T7 across the time when the upper surface 16D of the horizontal extended portion 16A of the table 16 reaches the table upward-downward directional intermediate position VTX, the counter-ejector control device 200 controls drive of each of the table displacement motor 96 and the table upward-downward movement motor 108 is one example of the table upward movement control processing set forth in the appended claims. The processing in which, in the time period from the time just after the elapse of the delay time period TD starting from the time T2 to the time T4, the counter-ejector control device 200 controls drive of each of the ledge displacement motor 64 and the ledge upward-downward movement motor 76 is one example of the ledge downward movement control processing set forth in the appended claims. The processing in which, in the time period from the time T6 to the time T9, the counter-ejector control device 200 controls drive of each of the ledge displacement motor 64 and the ledge upward-downward movement motor 76 is one example of the ledge upward movement control processing set forth in the appended claims. A combination of the counter-ejector control device 200 and the feeding-out motor 146 is one example of the conveyer drive control device set forth in the appended claims. The position at which the upside of the feeding-out conveyer 22 is disposed is one example of the given feeding-out position set forth in the appended claims. The table downwardmost position VT2 is one example of the table stop position set forth in the appended claims. The given displacement inhibition time period PS1 is one example of the given displacement inhibition time period set forth in the appended claims, and the given upward-downward movement inhibition time period PS2 is one example of the given upward-downward movement inhibition time period set forth in the appended claims. The main ledge upwardmost position VM1 is one example of the standby position set forth in the appended claims. The main ledge downwardmost position VM2 at which the lower surface 14D of the horizontal extended portion 14A of the main ledge 14 is located is one example of the given cooperative feeding-out position of the upper conveyer set forth in the appended claims.

<Modifications>

It should be understood that the present invention is not limited to the above embodiment, but various changes and modifications may be made therein without departing from the spirit and scope thereof as set forth in appended claims. Some examples of the modification will be described below.

(1) In the above embodiment, the control device 200 is configured to displace the left edge 16C of the horizontal extended portion 16A of the table 16 rightwardly until the time T5 when the batch detector 180 generates the absence-of-batch detection signal SD. However, the present invention is not limited to this configuration. For example, the control device 200 may be configured to: in a state in which the upper surface 16D of the horizontal extended portion 16A of the table 16 is moved downwardly to the table downwardmost position VT2, displace the left edge 16C of the horizontal extended portion 16A rightwardly to a fixed rest position leftward of the backward restriction member 162; subsequently, control drive of the feeding-out motor 146 to convey the batch BS on the feeding-out conveyer 22 leftwardly; and, according to the rotation detection signal from the built-in encoder of the feeding-out motor 146, determines whether or not a right edge of the batch BS is located leftward of the fixed rest position. Further, the control device 200 may be configured to, when the right edge of the batch BS is determined to be located leftward of the fixed rest position, move the upper surface 16D of the horizontal extended portion 16A of the table 16 upwardly toward the table upwardmost position VT1, and displace the left edge 16C of the horizontal extended portion 16A leftwardly toward the table leftwardmost position HT1.

(2) In the above embodiment, the batch detector 180 is disposed to satisfy a fixed positional relationship with the feeding-out conveyer 22 in the upward-rearward direction so as to detect the presence or absence of the batch BS on the upper side of the horizontal extended portion 16A of the table 16, and coupled to the frame of the elevator 90 such that it is displaced together with the table 16 in the rightward-leftward direction. However, the present invention is not limited to this configuration. For example, the batch detector 180 may be installed to the horizontal extended portion 16A of the table 16 at a position adjacent to the left edge 16C of the horizontal extended portion 16A. Alternatively, the batch detector 180 may be installed to the frame of the counter-ejector 1 at a fixed position leftward of the backward restriction member 162 in the rightward-leftward direction, such that it can be moved upwardly and downwardly together with the feeding-out conveyer 22.

(3) In the above embodiment, the batch detector 180 is provided as a means to detect the presence or absence of the batch BS on the upper side of the horizontal extended portion 16A of the table 16. However, the present invention is not limited to this configuration. For example, a timing at which the right edge of the batch BS is moved to a position leftward of the left edge 16C of the horizontal extended portion 16A of the table 16 in a state in which the upper surface 16D of the horizontal extended portion 16A of the table 16 is moved downwardly to the table downwardmost position VT2 may be detected based on the rotation detection signal from the built-in encoder of the table displacement motor 96 and the rotation detection signal from the built-in encoder of the feeding-out motor 146.

(4) In the above embodiment, the air blower 170 is installed to the frame of the counter-ejector 1 at a position below the feeding-out conveyer 22. However, the present invention is not limited to this configuration. For example, although a blower body of the air blower is installed to the frame of the counter-ejector 1, the blowing port may be installed to the horizontal extended portion 16A of the table 16, and coupled to the blower body via a blowing pipe. Further, the number of the blowing ports 172 of the air blower 170 is not limited to one, but a plurality of blowing ports may be arranged in the conveyance direction FD and a direction orthogonal to the conveyance direction FD.

(5) In the above embodiment, the table leftwardmost position HT1 where the left edge 16C of the horizontal extended portion 16A of the table 16 is located at the leftwardmost position varies according to the length of the corrugated paperboard sheet SH in the conveyance direction FD. However, the present invention is not limited to this configuration. For example, the table leftwardmost position HT1 may be set at a fixed position in conformity to a sheet length LS of the longest corrugated paperboard sheet SH in the conveyance direction FD, among various types of corrugated paperboard sheets SH which can be subjected to stacking and separating to be performed by the counter-ejector 1.

(6) In this embodiment, at the time T2, the upper surface 16D of the horizontal extended portion 16A of the table 16 is in the state in which it sandwiches the batch BS in cooperation with the lower surface 14D of the horizontal extended portion 14A of the main ledge 14, as depicted in FIG. 5. At the time T2, the control device 200 operates to start downward movement of the upper surface 16D of the horizontal extended portion 16A of the table 16 from the table upward-downward directional intermediate position VTX toward the table downwardmost position VT2, and start rightward displacement of the left edge 16C of the horizontal extended portion 16A of the table 16 from the table leftwardmost position HT1 toward the table rightwardmost position HT2. Further, at the time just after the elapse of the delay time period TD from the time T2, the control device 200 operates to start downward movement of the lower surface 14D of the horizontal extended portion 14A of the main ledge 14 from the main ledge upward-downward directional intermediate position VMX toward the main ledge downwardmost position VM2. However, the present invention is not limited to this configuration. For example, in place of or in addition to providing the delay time period TD, the control device 200 may control drive of the table upward-downward movement motor 108 and the ledge upward-downward movement motor 76 such that an acceleration during downward movement of the table 16 becomes greater than an acceleration during downward movement of the main ledge 14, in the time period from the time T2 to the time T4.

(7) In the above embodiment, a temporal magnitude (time length) relationship between a table downward movement time period during which the upper surface 16D of the horizontal extended portion 16A of the table 16 is moved downwardly from the table upwardmost position VT1 to the table downwardmost position VT2, and a table upward movement time period during which the upper surface 16D of the horizontal extended portion 16A of the table 16 is moved upwardly from the table downwardmost position VT2 to the table upwardmost position VT1 is not particularly limited. However, with a view to preventing breaking of the stacked posture of the batch BS placed on the upper surface 16D of the horizontal extended portion 16A, the table downward movement time period may be set to be greater than the table upward movement time period.

What is claimed is:
1. A counter-ejector comprising:
a forward contact plate which comes into contact with a forward edge of a corrugated paperboard sheet supplied from a folder-gluer in a given conveyance direction;
a correction plate which is disposed in opposed relation to the forward contact plate, and which comes into contact with a backward edge of the supplied corrugated paperboard sheet to align sheet edges;
a ledge which separates the corrugated paperboard sheets stacked inside a hopper part configured by the forward contact plate and the correction plate, in order to form a batch including a given number of the corrugated paperboard sheets;
a feeding-out conveyer which is disposed at a given feeding-out position below the forward contact plate and the correction plate, to feed out the batch in a given feeding-out direction oriented in a same direction as the conveyance direction;
an elevator which comprises a table performing an upward-downward movement to transport the batch placed on the table from the hopper part to the feeding-out conveyer, and which is configured such that the table is displaceable in a forward-backward direction parallel to the feeding-out direction;
a backward restriction member which is disposed between the correction plate and the feeding-out conveyer, and which comes into contact with the backward edges of the corrugated paperboard sheets in the batch placed on the table to restrict displacement of the batch in a direction opposite to the feeding-out direction;
a table upward-downward movement drive device which moves the table upwardly and downwardly;
a table displacement drive device which displaces the table in the forward-backward direction parallel to the feeding-out direction; and a control device which is configured to control the table upward-downward movement drive device and the table displacement drive device, wherein the control device is configured to execute:

a table downward movement control processing of controlling the table upward-downward movement drive device and the table displacement drive device such that the table is displaced backwardly, in at least part of a time period including a time period during which the table is moved downwardly from the hopper part to a table stop position below the feeding-out position of the feeding-out conveyer, and a time period during which the table is stopped at the table stop position; and a table upward movement control processing of controlling the table upward-downward movement drive device and the table displacement drive device such that the table is displaced forwardly, in a time period during which the table is moved upwardly from the table stop position to the hopper part, wherein the counter-ejector further comprises:

a ledge upward-downward movement drive device which moves the ledge upwardly and downwardly;

a ledge displacement drive device which displaces the ledge in the forward-backward direction parallel to the feeding-out direction:

an upper conveyer which is disposed at a given cooperative feeding-out position below the forward contact plate in order to feed out the batch in the feeding-out direction in cooperation with the feeding-out conveyer; and a forward restriction member which is disposed between the forward contact plate and the upper conveyer, and which is configured to be displaceable in the forward-backward direction together with the forward contact plate, and which comes into contact with the forward edges of the corrugated paperboard sheets in the batch placed on the table to restrict displacement of the corrugated paperboard sheets in the feeding-out direction, wherein the control device is configured to execute:

a ledge downward movement control processing of controlling the ledge upward-downward movement drive device and the ledge displacement drive device such that the ledge is displaced forwardly, in at least part of a time period including a time period during which the ledge is moved downwardly from the hopper part to the upper conveyer, and a time period during which the ledge is stopped at the cooperative feeding-out position of the upper conveyer; and a ledge upward movement control processing of controlling the ledge upward-downward movement drive device such that the ledge is moved upwardly from the upper conveyer to a given standby position above the hopper part.

2. The counter-ejector according to claim 1, further comprising a detector which detects a presence or absence of the batch placed on the table, wherein, when the detector detects the absence of the batch after detecting the presence of the batch, the control device is configured to cause the table upward-downward movement drive device to start moving the table upwardly in order to execute the table upward movement control processing.

3. The counter-ejector according to claim 1, wherein the control device is configured to control the table upward-downward movement drive device and the table displacement drive device such that, in the table downward movement control processing, the table is displaced backwardly over an entire time period during which the table is moved downwardly from the hopper part to the table stop position.

4. The counter-ejector according to claim 1, wherein the control device is configured to control the table upward-downward movement drive device and the table displacement drive device such that, in the table upward movement control processing, the table is displaced forwardly over an entire time period during which the table is moved upwardly from the table stop position to the hopper part.

5. The counter-ejector according to claim 1, further comprising a conveyer drive control device which drives the feeding-out conveyer when the table is moved downwardly to the table stop position, wherein, in the ledge downward movement control processing, the control device is configured to control the ledge upward-downward movement drive device and the ledge displacement drive device in order to inhibit the ledge from being displaced forwardly in such a state that the ledge is in contact with the batch on the feeding-out conveyer from thereabove, in a given displacement inhibition time period after the table is moved downwardly to the table stop position, wherein, after an elapse of the displacement inhibition time period, the control device is configured to control the ledge upward-downward movement drive device and the ledge displacement drive device such that the ledge is displaced forwardly, only in a given upward-downward movement inhibition time period during which the ledge is stopped at the cooperative feeding-out position of the upper conveyer, and wherein, in the ledge upward movement control processing, after an elapse of the upward-downward movement inhibition time period, the control device is configured to control the ledge upward-downward movement drive device and the ledge displacement drive device such that the ledge is displaced forwardly when the ledge is moved upwardly toward the standby position.

6. The counter-ejector according to claim 1, wherein, in the ledge downward movement control processing, the control device is configured to control the ledge upward-downward movement drive device and the ledge displacement drive device such that the ledge is displaced forwardly over an entire period during which the ledge is moved downwardly from the hopper part to the upper conveyer.

7. The counter-ejector according to claim 1, wherein the control device is configured to control the ledge upward-downward movement drive device and the table upward-downward movement drive device such that the table starts to be moved downwardly from the hopper part toward the table stop position, before the ledge starts to be moved downwardly from the hopper part toward the upper conveyer.

8. The counter-ejector according to claim 1, wherein the control device is configured to control the ledge upward-downward movement drive device and the table upward-downward movement drive device such that the table starts to be moved downwardly from the hopper part to the table stop position at an acceleration larger than an acceleration generated when the ledge starts to be moved downwardly from the hopper part toward the upper conveyer.

9. The counter-ejector according to claim 1, further comprising an air blower which is operable to blow air toward the batch on the table from therebelow, in at least part of a time period during which the table is moved downwardly from the hopper part to the table stop position.

10. The counter-ejector according to claim 1,
wherein the table comprises a plurality of mounting extended parts which are arranged in a direction orthogonal to the conveyance direction in spaced-apart relation to each other, and which extend horizontally, and
wherein the backward restriction member comprises a plurality of restriction extended parts which are arranged, respectively, in gaps between adjacent ones of the mounting extended parts, and which extend vertically.

* * * * *